US011936718B2

(12) United States Patent
Totsuka et al.

(10) Patent No.: US 11,936,718 B2
(45) Date of Patent: Mar. 19, 2024

(54) INFORMATION PROCESSING DEVICE AND INFORMATION PROCESSING METHOD

(71) Applicant: Sony Group Corporation, Tokyo (JP)

(72) Inventors: Noriko Totsuka, Tokyo (JP); Hiroaki Ogawa, Tokyo (JP); Yuki Takeda, Tokyo (JP); Kan Kuroda, Tokyo (JP); Yoshinori Maeda, Tokyo (JP); Yuichiro Koyama, Tokyo (JP); Akira Takahashi, Tokyo (JP); Kazuya Tateishi, Tokyo (JP); Chie Kamada, Tokyo (JP); Emiru Tsunoo, Tokyo (JP); Akira Fukui, Tokyo (JP); Hideaki Watanabe, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 146 days.

(21) Appl. No.: 17/431,717

(22) PCT Filed: Feb. 10, 2020

(86) PCT No.: PCT/JP2020/005026
§ 371 (c)(1),
(2) Date: Aug. 18, 2021

(87) PCT Pub. No.: WO2020/175115
PCT Pub. Date: Sep. 3, 2020

(65) Prior Publication Data
US 2022/0141283 A1 May 5, 2022

(30) Foreign Application Priority Data
Feb. 25, 2019 (JP) .................. 2019-031295

(51) Int. Cl.
*G06F 15/16* (2006.01)
*G06F 3/01* (2006.01)
(Continued)

(52) U.S. Cl.
CPC .............. *H04L 67/10* (2013.01); *G06F 3/016* (2013.01); *G06F 3/167* (2013.01); *H04L 67/025* (2013.01);
(Continued)

(58) Field of Classification Search
CPC ....... H04L 67/10; H04L 67/55; H04L 67/025; G06F 3/016; G06F 3/167; G06F 2203/0381
See application file for complete search history.

(56) References Cited

U.S. PATENT DOCUMENTS 9,348,540 B2 * 5/2016 Tanaka ................ G06F 11/2041
10,616,726 B1 * 4/2020 Freeman, II ............ H04W 8/02
(Continued)

FOREIGN PATENT DOCUMENTS

JP 2011-253375 A 12/2011
WO 2016/158792 A1 10/2016

OTHER PUBLICATIONS

International Search Report and Written Opinion dated Apr. 21, 2020, received for PCT Application PCT/JP2020/005026, Filed on Feb. 10, 2020, 9 pages including English Translation.

*Primary Examiner* — Oleg Survillo
(74) *Attorney, Agent, or Firm* — XSENSUS LLP

(57) ABSTRACT

The present technology relates to an information processing device and an information processing method that enable output of information using a more optimal output modal. Provided is an information processing device including a processing unit configured to perform processes of: acquiring apparatus information regarding an output modal for each electronic apparatus; selecting an electronic apparatus having an output modal that outputs information from among a plurality of electronic apparatuses on the basis of the acquired apparatus information; and outputting the information from an output modal of the selected electronic (Continued)

apparatus. The present technology can be applied to, for example, electronic apparatuses such as information apparatuses, video apparatuses, audio apparatuses, or household electrical appliances.

12 Claims, 24 Drawing Sheets

(51) Int. Cl.
*G06F 3/16* (2006.01)
*H04L 67/025* (2022.01)
*H04L 67/10* (2022.01)
*H04L 67/55* (2022.01)

(52) U.S. Cl.
CPC ...... *H04L 67/55* (2022.05); *G06F 2203/0381* (2013.01)

(56) References Cited

U.S. PATENT DOCUMENTS

| | | | |
|---|---|---|---|
| 2003/0073411 A1* | 4/2003 | Meade, II | G06F 1/1613 455/3.06 |
| 2018/0074594 A1* | 3/2018 | Herz | H04N 21/4622 |
| 2018/0285065 A1* | 10/2018 | Jeong | G06F 3/167 |
| 2019/0189120 A1* | 6/2019 | Sohn | G10L 15/22 |
| 2020/0137175 A1* | 4/2020 | Ganci, Jr. | H04L 67/303 |

* cited by examiner

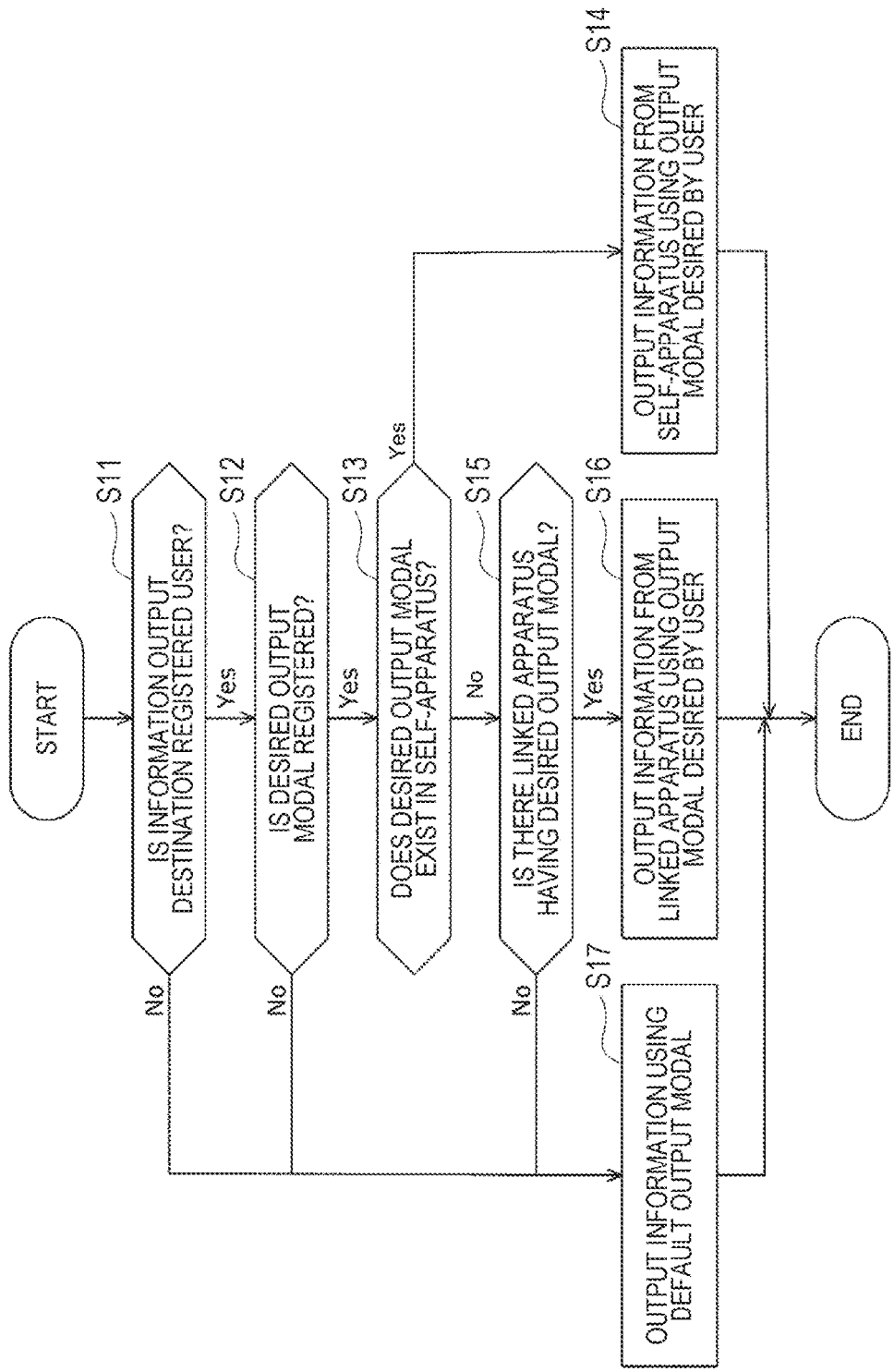

FIG. 6

USER INFORMATION TABLE

| USER ID | USER NAME | GENDER | AGE | DESIRED OUTPUT MODAL |
|---|---|---|---|---|
| 01 | HIROSHI | M | 38 | - |
| 02 | YUKI | F | 38 | ALWAYS DESIRE SCREEN OUTPUT |
| 03 | YUTA | M | 10 | - |
| 04 | YUZO | M | 75 | SPEAK SLOWLY IN VOICE READING-ALOUD |

FIG. 7

LINKED APPARATUS INFORMATION TABLE

| APPARATUS ID | APPARATUS NAME | OUTPUT MODAL |
|---|---|---|
| 00 | TELEVISION | SCREEN, VOICE |
| 01 | SMARTPHONE A | SCREEN, VOICE |
| 02 | SMARTPHONE B | SCREEN, VOICE |
| 03 | SMART SPEAKER | VOICE |
| 04 | ROBOT VACUUM CLEANER | VOICE |
| 05 | REFRIGERATOR | ELECTRONIC SOUND |
| 06 | WASHING MACHINE | ELECTRONIC SOUND |
| ⋮ | ⋮ | ⋮ |

FIG. 8

LINKED APPARATUS INFORMATION TABLE

| | | SCREEN FEEDBACK | | SOUND FEEDBACK | | OPTICAL FEEDBACK | | | |
|---|---|---|---|---|---|---|---|---|---|
| ID | APPARATUS NAME | MOVING IMAGE OUTPUT | ALPHANUMERIC OUTPUT | VOICE READING-ALOUD | ELECTRONIC SOUND OUTPUT | LIGHT EMISSION IN MULTIPLE COLORS | LIGHT EMISSION IN SINGLE COLOR | VIBRATION | OPERATION |
| 00 | TELEVISION | ○ | ○ | ○ | ○ | | | | |
| 01 | SMARTPHONE A | ○ | ○ | ○ | ○ | | ○ | ○ | |
| 02 | SMARTPHONE B | ○ | ○ | ○ | ○ | | ○ | ○ | |
| 03 | SMART SPEAKER | | | ○ | ○ | | | | |
| 04 | ROBOT VACUUM CLEANER | | | | ○ | ○ | | | ○ |
| 05 | REFRIGERATOR | | ○ | | ○ | | ○ | | |
| 06 | WASHING MACHINE | | ○ | | ○ | | ○ | | |
| 07 | MICROWAVE OVEN | ○ | ○ | ○ | ○ | ○ | | | |
| 08 | SMARTWATCH | | | | | | | ○ | |
| ... | ... | ... | ... | ... | ... | ... | ... | ... | ... |

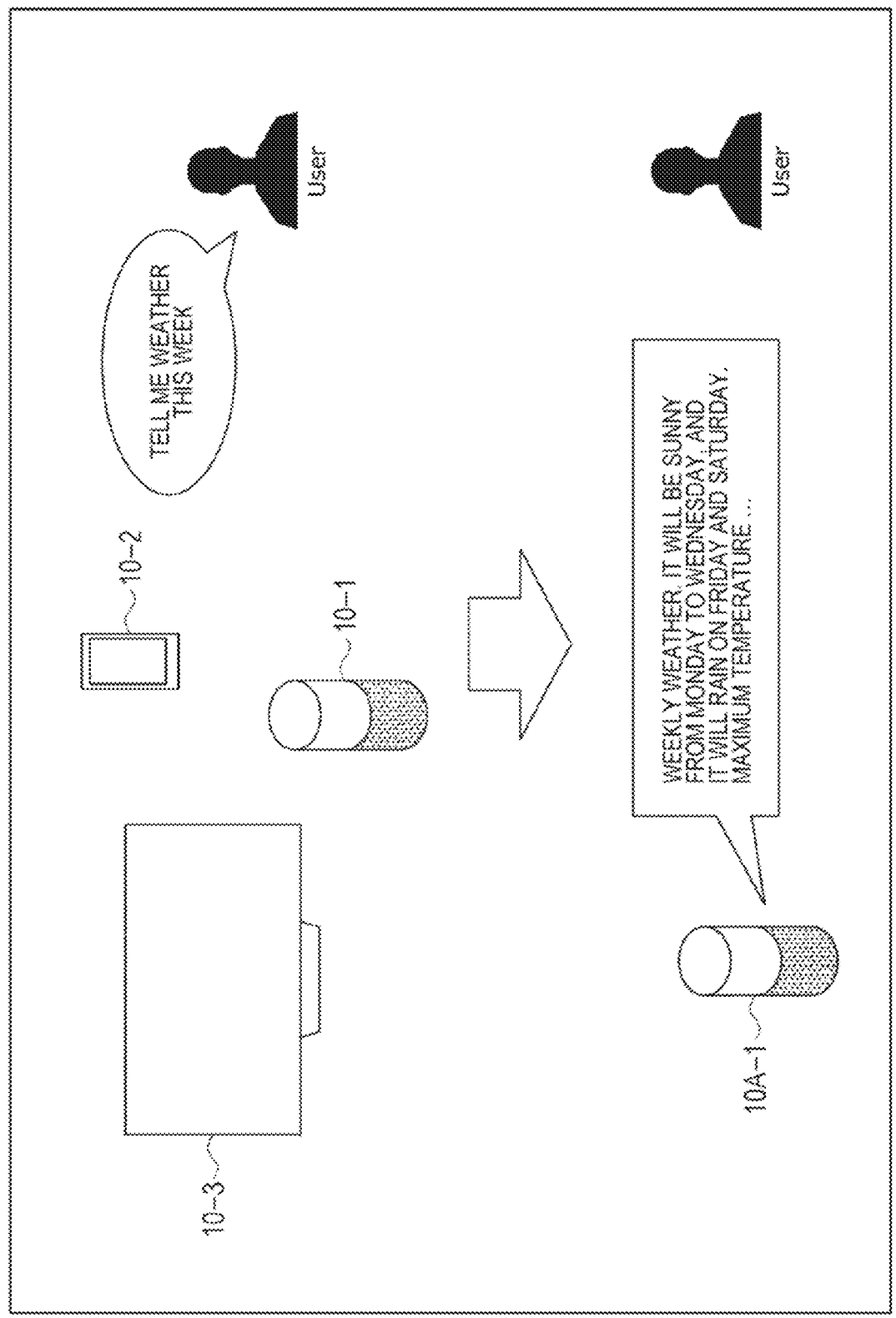

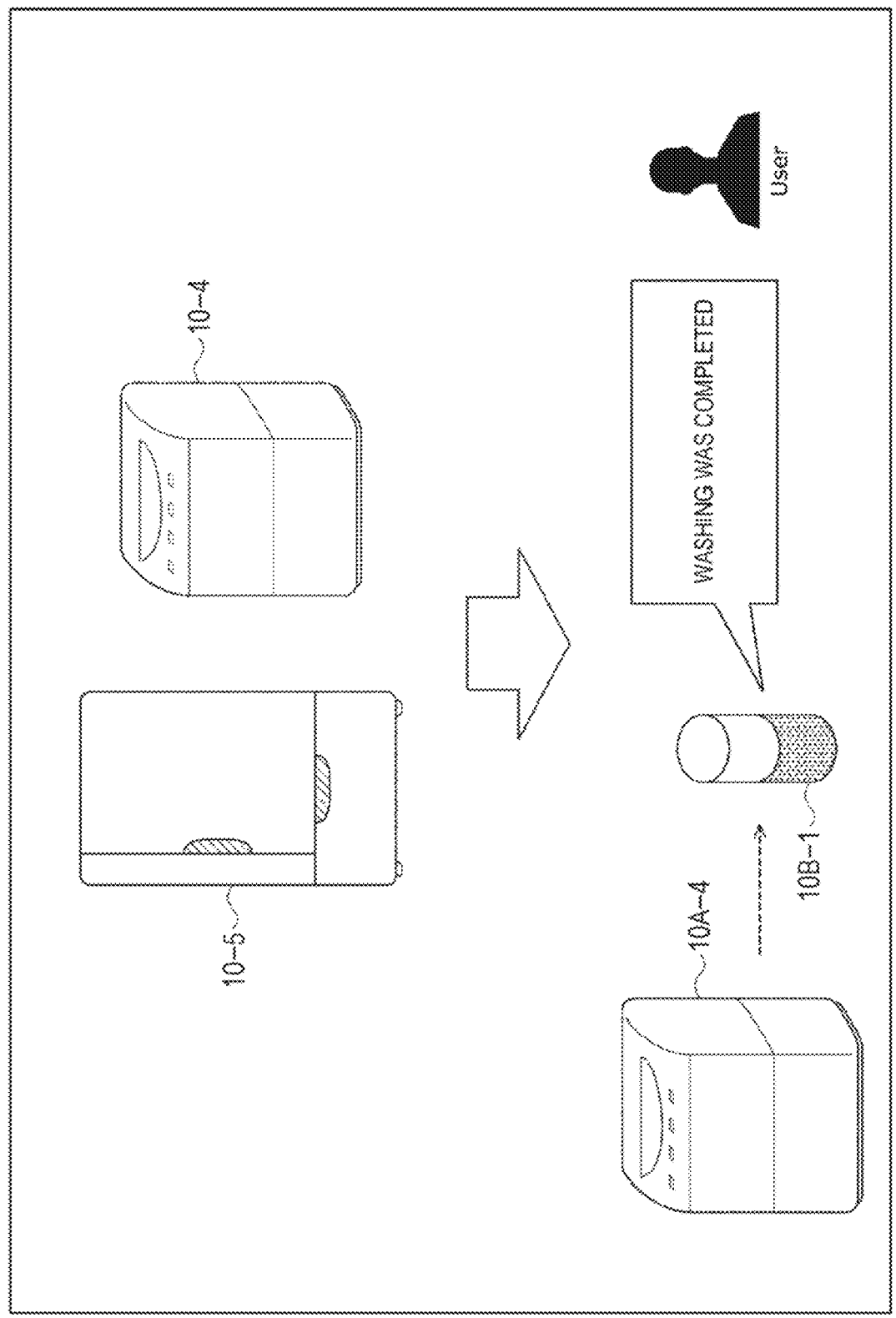

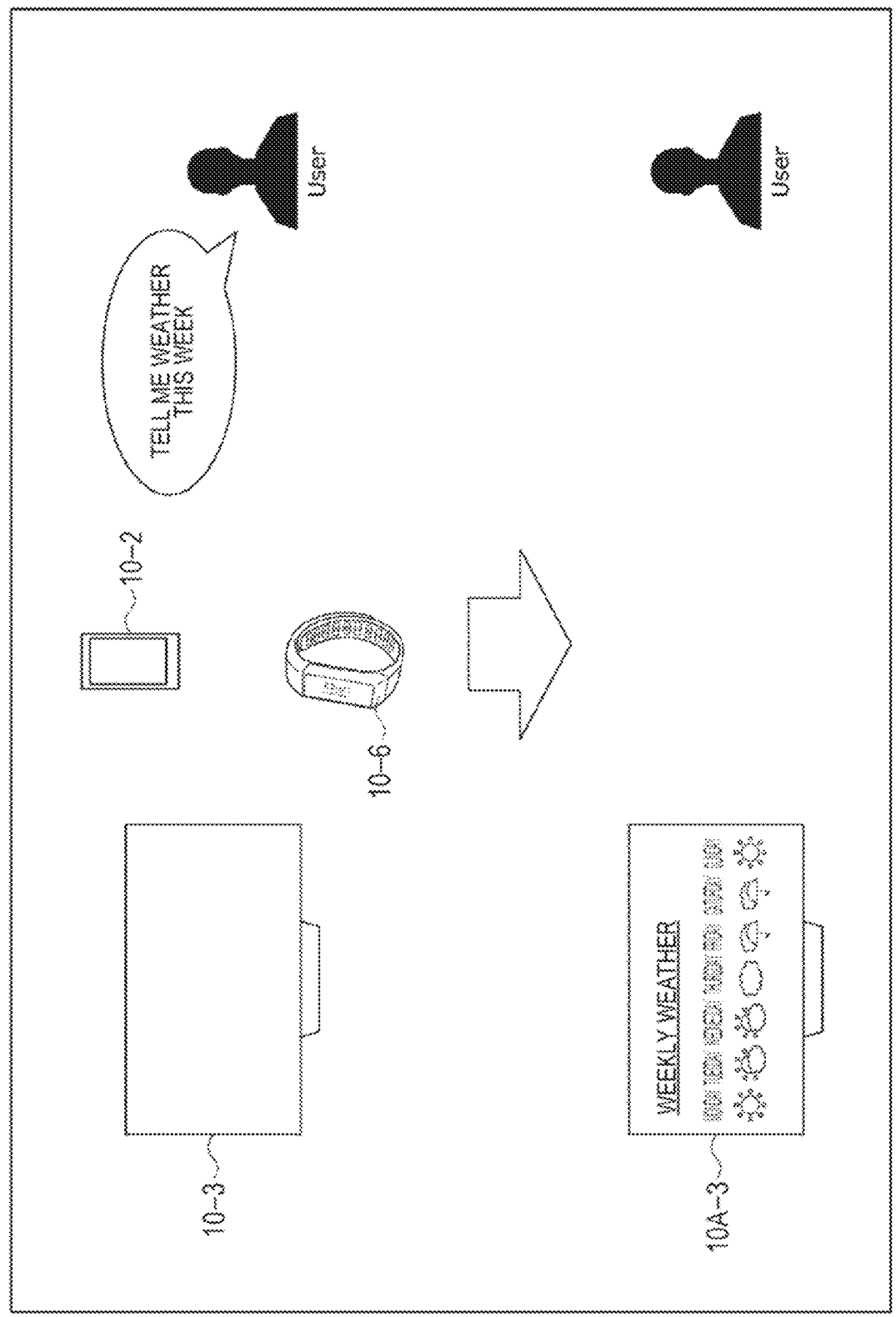

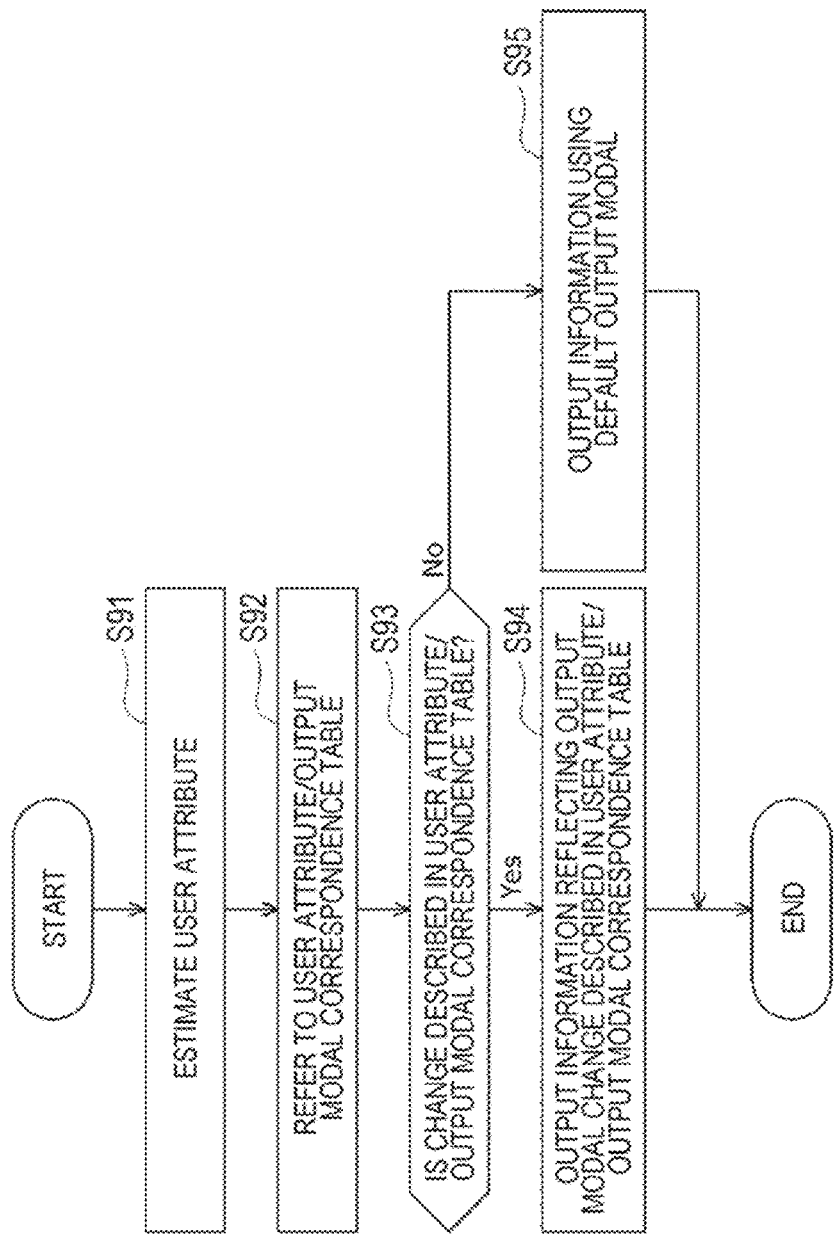

FIG. 17

USER ATTRIBUTE/OUTPUT MODAL CORRESPONDENCE TABLE

| USER ATTRIBUTE | OUTPUT MODAL CHANGE |
|---|---|
| ESTIMATED AGE IS 70 OR OLDER | OUTPUT BY VOICE READING-ALOUD RATHER THAN ELECTRONIC SOUND. INCREASE VOLUME BY 1.2 TIMES AT THIS TIME. |
| ESTIMATED AGE IS 10 OR YOUNGER | USE HIRAGANA INSTEAD OF KANJI IN CASE OF SCREEN OUTPUT. |

FIG. 18

USER INFORMATION TABLE

| USER ID | USER NAME | GENDER | AGE | DESIRED OUTPUT MODAL | PRIORITY |
|---|---|---|---|---|---|
| 01 | HIROSHI | M | 38 | - | 2 |
| 02 | YUKI | F | 38 | ALWAYS DESIRE SCREEN OUTPUT | 1 |
| 03 | YUTA | M | 10 | - | 3 |
| 04 | YUZO | M | 75 | SPEAK SLOWLY IN VOICE READING-ALOUD | 4 |

INFORMATION PROCESSING DEVICE AND INFORMATION PROCESSING METHOD

CROSS-REFERENCE TO RELATED APPLICATIONS

The present application is based on PCT filing PCT/JP2020/005026, filed Feb. 10, 2020, which claims priority to JP 2019-031295, filed Feb. 25, 2019, the entire contents of each are incorporated herein by reference.

TECHNICAL FIELD

The present technology relates to an information processing device and an information processing method, and more particularly to an information processing device and an information processing method that enable output of information using a more optimal output modal.

BACKGROUND ART

A user sometimes desires to specify an output modal of an electronic apparatus when using the electronic apparatus.

Furthermore, a technology for switching an information provision level and an output mode depending on user information obtained from a voice or an image and a system state has been disclosed (e.g., see Patent Document 1).

CITATION LIST

Patent Document

Patent Document 1: Japanese Patent Application Laid-Open No. 2011-253375

SUMMARY OF THE INVENTION

Problems to be Solved by the Invention

By the way, in a case where it is desired to specify an output modal of an electronic apparatus, some electronic apparatuses have a limited output modal, and a technology for outputting information using a more optimal output modal is required.

The present technology has been made in view of such a situation, and makes it possible to output information using a more optimal output modal.

Solutions to Problems

An information processing device of an aspect of the present technology is an information processing device including a processing unit configured to perform processes of: acquiring apparatus information regarding an output modal for each electronic apparatus; selecting an electronic apparatus having an output modal that outputs information from among a plurality of electronic apparatuses on the basis of the acquired apparatus information; and outputting the information from an output modal of the selected electronic apparatus.

An information processing method of an aspect of the present technology is an information processing method in which the information processing device acquires apparatus information regarding an output modal for each electronic apparatus, selects an electronic apparatus having an output modal that outputs information from among a plurality of electronic apparatuses on the basis of the acquired apparatus information, and outputs the information from an output modal of the selected electronic apparatus.

In an information processing device and an information processing method of an aspect of the present technology, apparatus information regarding an output modal for each electronic apparatus is acquired, an electronic apparatus having an output modal that outputs information is selected from among a plurality of electronic apparatuses on the basis of the acquired apparatus information, and the information is outputted from an output modal of the selected electronic apparatus.

An information processing device of an aspect of the present technology is an information processing device including a processing unit configured to perform processes of: selecting an electronic apparatus having an output modal corresponding to a desired output modal of a user from among a plurality of electronic apparatuses on the basis of user information including the desired output modal and apparatus information regarding an output modal for each electronic apparatus, receiving via a network an output command to output information transmitted from another information processing device that transmits the output command from an output modal corresponding to the desired output modal to the selected electronic apparatus, and outputting the information from an output modal corresponding to the desired output modal on the basis of the received output command.

An information processing method of an aspect of the present technology is an information processing method in which an information processing device selects an electronic apparatus having an output modal corresponding to a desired output modal of a user from among a plurality of electronic apparatuses on the basis of user information including the desired output modal and apparatus information regarding an output modal for each electronic apparatus, receives via a network an output command to output information transmitted from another information processing device that transmits the output command from an output modal corresponding to the desired output modal to the selected electronic apparatus, and outputs the information from an output modal corresponding to the desired output modal on the basis of the received output command.

In an information processing device and an information processing method of an aspect of the present technology, an electronic apparatus having an output modal corresponding to a desired output modal of a user is selected from among a plurality of electronic apparatuses on the basis of user information including the desired output modal and apparatus information regarding an output modal for each electronic apparatus, an output command to output information transmitted from another information processing device that transmits the output command from an output modal corresponding to the desired output modal to the selected electronic apparatus is received via a network, and the information is outputted from an output modal corresponding to the desired output modal on the basis of the received output command.

Note that an information processing device of an aspect of the present technology may be an independent device or an internal block that constitutes one device.

BRIEF DESCRIPTION OF DRAWINGS

FIG. 5 is a flowchart for explaining the flow of output modal decision processing.

FIG. 6 is a diagram showing an example of a user information table.

FIG. 7 is a diagram showing a first example of a linked apparatus information table.

FIG. 8 is a diagram showing a second example of a linked apparatus information table.

FIG. 9 is a diagram showing an example of a case where a self-apparatus capable of voice reading-aloud outputs an output.

FIG. 10 is a diagram showing an example of a case where output is requested from a linked apparatus capable of voice reading-aloud.

FIG. 11 is a diagram showing an example of a case where a self-apparatus capable of screen output outputs an output.

FIG. 16 is a flowchart for explaining the flow of an optimal output modal selection processing.

FIG. 17 is a diagram showing an example of a user attribute/output modal correspondence table.

FIG. 18 is a diagram showing another example of a user information table.

MODE FOR CARRYING OUT THE INVENTION

Hereinafter, an embodiment of the present technology will be described with reference to the drawings. Note that the explanations will be given in the following order.

1. Embodiment of the present technology
2. System configuration
3. Computer configuration <1. Embodiment of the Present Technology>

(System Configuration)

Figure 1:
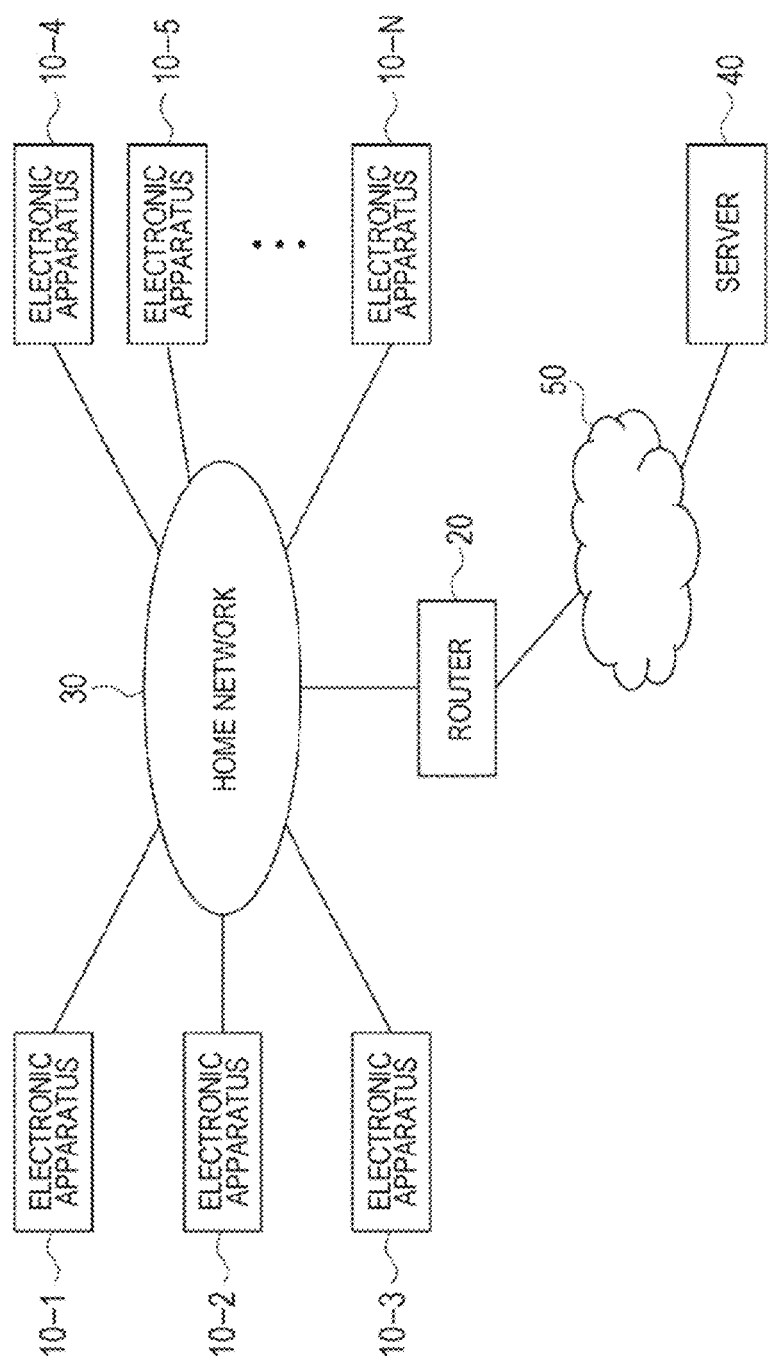
FIG. 1 is a block diagram showing an example of the configuration of an embodiment of a system including an electronic apparatus to which the present technology is applied.

FIG. 1 shows an example of the configuration of an embodiment of a system including an electronic apparatus to which the present technology is applied.

In FIG. 1, electronic apparatuses 10-1 to 10-N (N: an integer equal to or larger than 2) and a router 20 are connected with each other via a home network 30. This home network 30 is configured with, for example, a network such as a wireless local area network (LAN).

The electronic apparatus 10-1 is configured as, for example, an apparatus such as an information apparatus, a video apparatus, an audio apparatus, or a household electrical appliance.

Note that the information apparatus includes, for example, a smartphone, a mobile phone, a smartwatch, a tablet terminal, a game machine, a personal computer, and the like. Furthermore, the video apparatus includes, for example, a television receiver, a projector, a display device, and the like.

Moreover, the audio apparatus includes, for example, a smart speaker, a speaker, a headphone, and the like. Furthermore, the household electrical appliance includes, for example, a major appliance such as washing machine, a refrigerator, and a microwave oven. Note that the apparatuses listed here are examples, and may include, for example, robots such as animal-shaped or human-shaped domestic robots, robot vacuum cleaners, and the like.

The electronic apparatus 10-1 can output information using an optimal output modal. Here, an output modal is (information) expression means provided in each of the electronic apparatuses 10-1 to 10-N. Furthermore, the electronic apparatus 10-1 can exchange information with other electronic apparatuses 10 such as the electronic apparatuses 10-2 to 10-N via the home network 30.

The electronic apparatuses 10-2 to 10-N are each configured as an apparatus such as an information apparatus, similarly to the electronic apparatus 10-1. Each of the electronic apparatuses 10-2 to 10-N can output information using an optimal output modal. Furthermore, each of the electronic apparatuses 10-2 to 10-N can exchange information with other electronic apparatuses 10.

Furthermore, in FIG. 1, the router 20 can be connected with Internet 50, and each of the electronic apparatuses 10-1 to 10-N can exchange various information with a server 40 via the Internet 50.

The server 40 is configured with, for example, one or a plurality of servers and is installed in a data center or the like. The server 40 manages information regarding users and devices, and the like by a database, and can provide various information via the Internet 50 in response to a request from any of electronic apparatuses 10-1 to 10-N.

In the following description, note that the electronic apparatuses 10-1 to 10-N are simply referred to as electronic apparatuses 10 in a case where it is unnecessary to distinguish them.

Furthermore, as will be described in detail later, since the electronic apparatuses 10 include two types of apparatuses, i.e., a self-apparatus that is a subject of operation and a linked apparatus that operates in linkage with the self-apparatus, depending on the operation content, an electronic apparatus 10 that operates as the self-apparatus is also described as an electronic apparatus 10A, while an electronic apparatus 10 that operates as a linked apparatus is also described as an electronic apparatus 10B to be distinguished therefrom in the following description.

(Electronic Apparatus Configuration)

Figure 2:
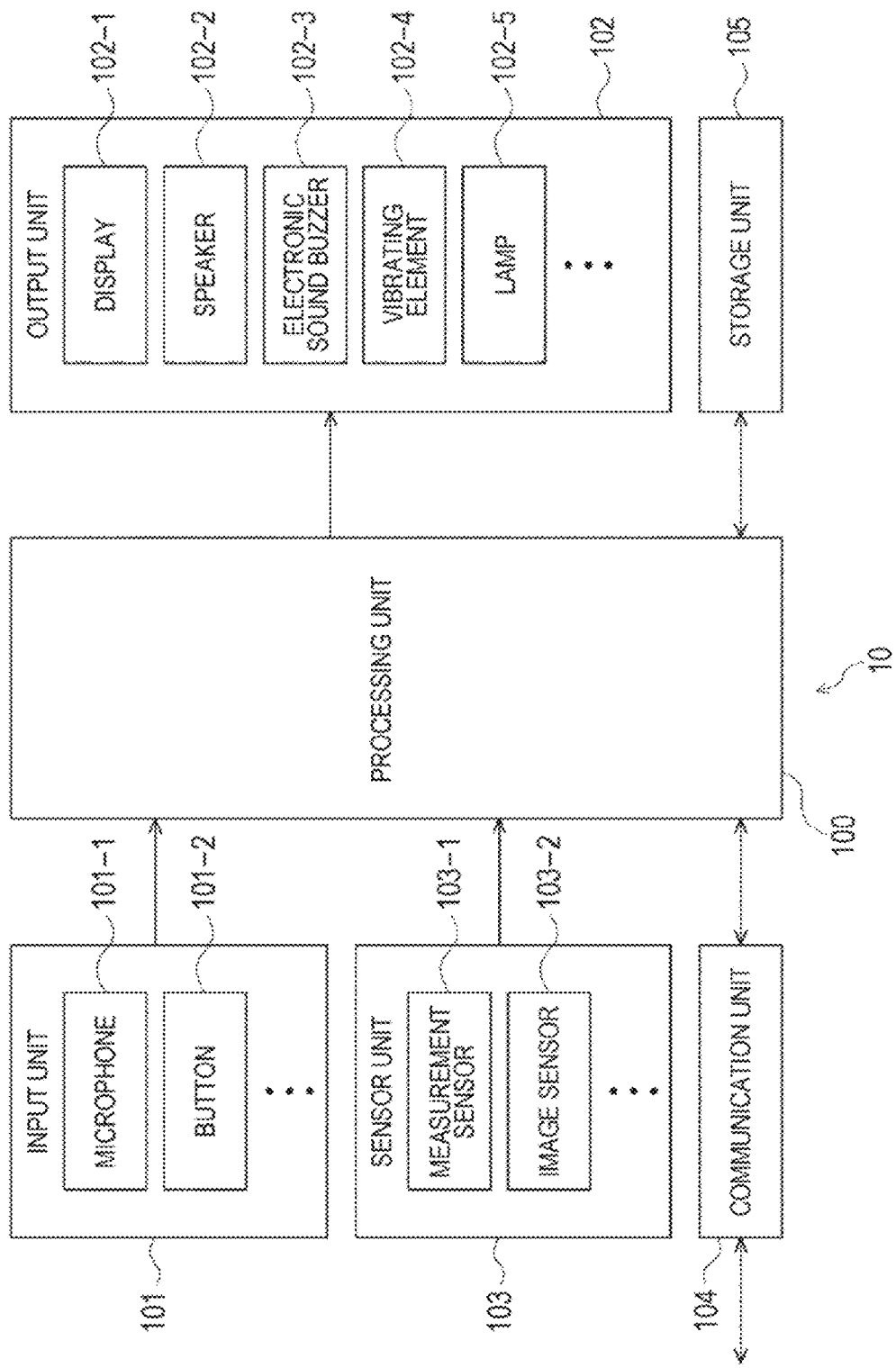
FIG. 2 is a block diagram showing an example of the configuration of an electronic apparatus to which the present technology is applied.

FIG. 2 shows an example of the configuration of the electronic apparatus 10 of FIG. 1.

In FIG. 2, the electronic apparatus 10 includes a processing unit 100, an input unit 101, an output unit 102, a sensor unit 103, a communication unit 104, and a storage unit 105.

The processing unit 100 is configured with, for example, a processor such as a central processing unit (CPU) or a microcontroller, a field programmable gate array (FPGA), or the like. The processing unit 100 is a central processing device that controls the operation of each unit and performs various arithmetic processes.

The input unit 101 includes, for example, a microphone 101-1, a button 101-2, and the like as an input interface with the user.

The microphone 101-1 converts external sounds including a voice of the user and ambient sound into electric signals, and supplies voice information obtained as a result to the processing unit 100. Furthermore, the button 101-2 is a physical button and supplies operation information according to operation by the user to the processing unit 100.

Although a case where the microphone 101-1 and the button 101-2 are included as the input unit 101 has been illustrated here, note that a touch panel combined with a display 102-1 described later, or other input means such as a keyboard or a mouse, for example, may be included.

The output unit 102 includes, for example, the display 102-1, a speaker 102-2, an electronic sound buzzer 102-3, a vibrating element 102-4, and a lamp 102-5 as an output interface with the user.

The display 102-1 is a display device such as a liquid crystal display (LCD) or an organic light emitting diode (OLED) display, for example. The display 102-1 displays information according to an output command supplied from the processing unit 100.

The speaker 102-2 is a voice output device that reproduces, for example, sounds such as a voice and music. The speaker 102-2 outputs a sound corresponding to an output command supplied from the processing unit 100. The electronic sound buzzer 102-3 is a sound producing device capable of outputting an electronic sound such as "pee", for example. The electronic sound buzzer 102-3 outputs an electronic sound according to an output command supplied from the processing unit 100.

The vibrating element 102-4 vibrates in response to an output command supplied from the processing unit 100 to give a vibration stimulus to the user. The lamp 102-5 is a light emitting device including a light source such as a light emitting diode (LED), for example. The lamp 102-5 lights up in response to an output command supplied from the processing unit 100.

Although a case where the output unit 102 includes the display 102-1, the speaker 102-2, and the like has been illustrated here, note that the output unit may include other output means such as, for example, a robot driving part (e.g., head, hand, etc.).

The sensor unit 103 is configured with, for example, various sensor devices and the like. This sensor device includes, for example, a measurement sensor 103-1, an image sensor 103-2, and the like.

The measurement sensor 103-1 can include, for example, a magnetic sensor that detects the magnitude and the direction of a magnetic field (magnetic flux), an acceleration sensor that detects an acceleration, a gyro sensor that detects an angle (posture), an angular velocity, and an angular acceleration, a proximity sensor that detects an adjacent object, and the like. The measurement sensor 103-1 senses the user, the vicinity thereof, and the like, and supplies the resulting environment information (including sensing information) to the processing unit 100.

The image sensor 103-2 includes, for example, an image sensor and a signal processing unit. The image sensor 103-2 generates image information by performing various signal processing by the signal processing unit on an imaging signal obtained by imaging an object by an image sensor, and supplies the image information to the processing unit 100.

Although a case where the sensor unit 103 includes the measurement sensor 103-1, the image sensor 103-2, and the like has been described here, note that the sensor unit may include, for example, a sensor for measuring ambient environment such as a temperature sensor that detects temperature, a humidity sensor that detects humidity, or an ambient light sensor that detects ambient brightness, or another sensor device such as a biosensor that detects biometric information such as breathing, pulse, fingerprint, or iris.

The communication unit 104 is configured with a communication module or the like that supports wireless communication or wired communication conforming to a predetermined standard. This communication module is compatible with communication methods such as wireless LAN or cellular communication (e.g., LTE-Advanced or 5G), for example. The communication unit 104 exchanges various information with another electronic apparatus 10 or the server 40 under the control of the processing unit 100.

The storage unit 105 is configured with a storage device such as a semiconductor memory or a hard disk drive (HDD), for example. The storage unit 105 stores various information under the control of the processing unit 100.

Note that the configuration of the electronic apparatus 10 shown in FIG. 2 is an example, and it is not necessary to include all the components, and, for example, some components such as the input unit 101 and the sensor unit 103 may be excluded. Alternatively, other components may be added to the configuration of the electronic apparatus 10 shown in FIG. 2.

Figure 3:
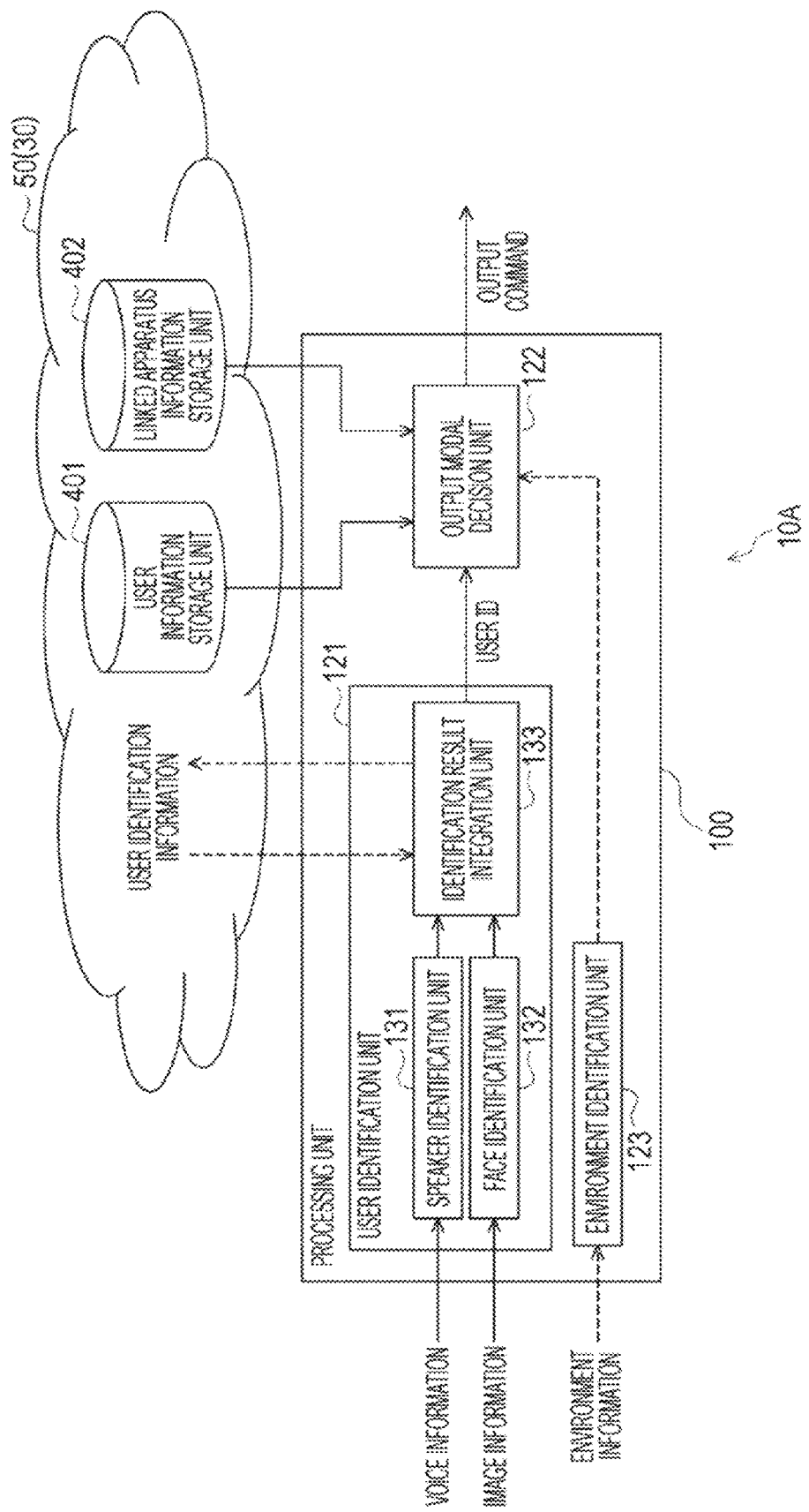
FIG. 3 is a block diagram showing an example of the functional configuration of an electronic apparatus that operates as a self-apparatus.

(Functional configuration of self-apparatus) FIG. 3 shows an example of the functional configuration of an electronic apparatus 10A that operates as the self-apparatus.

In the electronic apparatus 10A, the processing unit 100 includes a user identification unit 121, an output modal decision unit 122, and an environment identification unit 123.

The user identification unit 121 has a function of identifying a user to be the information output destination. The user identification unit 121 includes a speaker identification unit 131, a face identification unit 132, and an identification result integration unit 133.

The speaker identification unit 131 performs speaker recognition processing using the voice information supplied from the microphone 101-1 and supplies the identification result to the identification result integration unit 133. In this speaker recognition processing, for example, a known technique such as a speaker recognition algorithm that extracts a feature amount from voice information, models the feature amount, and recognizes a voice of an individual by using the feature amount can be used.

The face identification unit 132 performs face recognition processing using the image information supplied from the image sensor 103-2, and supplies the identification result to the identification result integration unit 133. In this face recognition processing, for example, it is possible to use a known technique such as a face recognition algorithm that extracts a conspicuous feature from image information, searches for an image having a matching feature, and recognizes a face of an individual.

The identification result integration unit 133 integrates the speaker identification result supplied from the speaker identification unit 131 and the face identification result supplied from the face identification unit 132, identifies a user (user on the spot) to be the information output destination, and supplies the user identification result to the output modal decision unit 122. As this user identification result, for example, a user ID assigned to the identified user can be used.

The output modal decision unit 122 refers to the user information registered in advance and acquires the desired output modal according to the user identification result (user ID) supplied from the identification result integration unit 133.

Furthermore, in a case where the output modal decision unit 122 has the desired output modal of the identified user as the output modal of the self-apparatus, the output modal decision unit supplies an output command of information to the output unit 102 of the self-apparatus corresponding to the desired output modal. Therefore, in the electronic apparatus 10A operating as the self-apparatus, the output unit 102 corresponding to the desired output modal outputs information according to the output command from the output modal decision unit 122.

On the other hand, in a case where the output modal decision unit 122 does not have the desired output modal of the identified user as an output modal of the self-apparatus, the output modal decision unit refers to (acquires) the linked apparatus information registered in advance and selects a linked apparatus having the desired output modal of the identified user.

Then, the output modal decision unit 122 controls the communication unit 104 to transmit an output command of information to a linked apparatus having an output unit 102 corresponding to the desired output modal via the home network 30. Therefore, in the electronic apparatus 10B operating as the linked apparatus, the output unit 102 corresponding to the desired output modal outputs information according to the output command transmitted from the electronic apparatus 10A operating as the self-apparatus.

Here, in a case where the identified user has not set the desired output modal, it is only required to output information corresponding to the output command from the output modal decision unit 122 from the output modal (output unit 102) of the self-apparatus.

Furthermore, the output modal decision unit 122 can control the communication unit 104 to acquire user information and linked apparatus information from the server 40 via the Internet 50.

That is, the server 40 has a user information storage unit 401 that stores a user information table, and a linked apparatus information storage unit 402 that stores a linked apparatus information table, and can provide the user information stored in the user information table, or the linked apparatus information stored in the linked apparatus information table in response to a request from the electronic apparatus 10A. In other words, it can be said that the user information table and the linked apparatus information table are information shared among a plurality of electronic apparatuses 10 connected with the home network 30.

Note that the user identification unit 121 is only required to perform at least one of speaker identification or face identification, and in a case where only one of speaker identification or face identification is performed, the identification result integration unit 133 does not need to integrate the identification results, and the user identification result (user ID) corresponding to one identification result is supplied to the output modal decision unit 122.

Furthermore, for example, assumed is the following two patterns as the timing at which the electronic apparatus 10A identifies the user. The first is when the electronic apparatus 10A tries to notify the user of information. Examples of this case include incoming call and email notifications, alarms and reminders, error notifications, and the like.

The second is when the user requests information from the electronic apparatus 10A. Here, for example, a case where the user operates a remote controller or a voice input is made with a microphone is included. Specifically, for example, voice utterances such as "Tell me the weather tomorrow", "I want to register a schedule", and "I want to search for information" in a case where the user uses a voice AI assistant service are included.

Furthermore, in a case where it is difficult in the electronic apparatus 10A that operates as the self-apparatus to identify the user by the user identification unit 121, the electronic apparatus may acquire the user identification information from the electronic apparatus 10B in linkage with the electronic apparatus 10B that operates as the linked apparatus via the home network 30, so that user identification using this user identification information is achieved.

The environment identification unit 123 performs environment identification processing using the environment information (including sensing information) supplied from the sensor unit 103 (e.g., measurement sensor 103-1, etc.), the communication unit 104, or the like, and supplies the identification result to the output modal decision unit 122.

This environment information can include, for example, various information such as information regarding the user (e.g., information indicating the position of the user), information regarding other apparatuses (e.g., information on other devices such as smartwatch activity information, or information indicating the usage status of other apparatuses), and information regarding the vicinity. Furthermore, in this environment identification processing, it is possible to obtain an identification result such as which room the user is currently in or what apparatus is near the user, for example, by executing an environment identification algorithm using the environment information.

That is, in a case where the electronic apparatus 10A that operates as the self-apparatus does not include a device (camera or microphone) for user identification, processing such as user identification may be performed using information from other electronic apparatus 10 linked with the apparatus.

Specifically, when the smart speaker outputs information, there is a case where user identification is performed by using the image information of a camera built in the television receiver located in the same room. Furthermore, in some cases, whether the user is in the room or not is determined using global positioning system (GPS) information of the smartphone when the television receiver outputs information.

The output modal decision unit 122 can decide the output modal in consideration of the environment identification result supplied from the environment identification unit 123 in the process of deciding the output modal according to the desired output modal of the identified user and notify the output unit 102 of the self-apparatus or the linked apparatus of an output command.

(Functional Configuration of Linked Apparatus)

Figure 4:
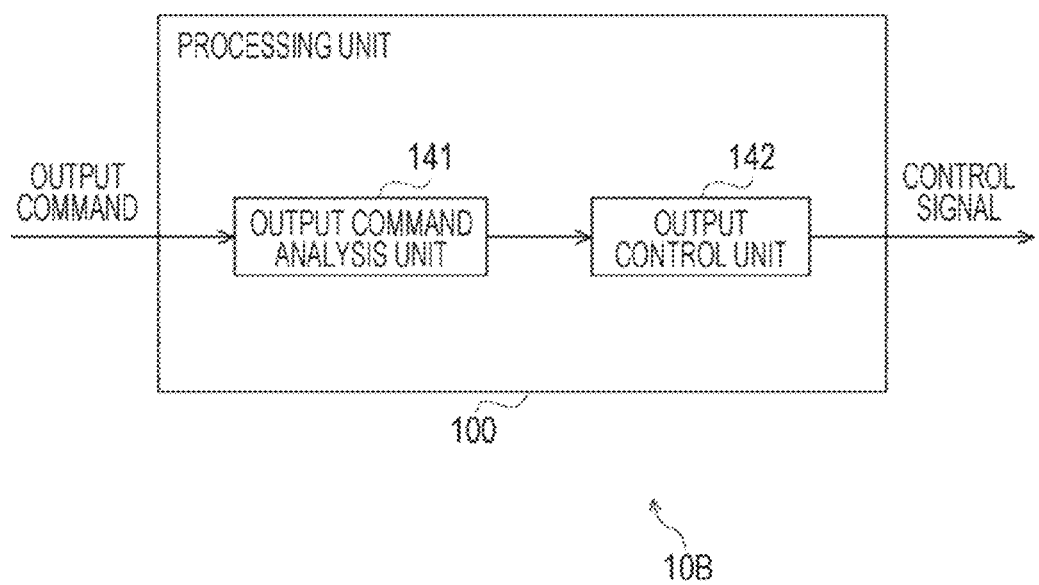
FIG. 4 is a block diagram showing an example of the functional configuration of an electronic apparatus that operates as a linked apparatus.

FIG. 4 shows an example of the functional configuration of an electronic apparatus 10B that operates as a linked apparatus.

In the electronic apparatus 10B, the processing unit 100 includes an output command analysis unit 141 and an output control unit 142. Furthermore, in the electronic apparatus 10B, in a case where the communication unit 104 receives an output command from the electronic apparatus 10A that operates as the self-apparatus via the home network 30, the communication unit supplies the output command to the output command analysis unit 141.

The output command analysis unit 141 analyzes the output command supplied from the communication unit 104 and supplies the analysis result to the output control unit 142.

The output control unit 142 supplies a control signal to the output unit 102 corresponding to the desired output modal on the basis of the analysis result of the output command from the output command analysis unit 141. Therefore, in the electronic apparatus 10B that operates as the linked apparatus, the output unit 102 corresponding to the desired output modal outputs information according to the output command transmitted from the electronic apparatus 10A that operates as the self-apparatus.

The electronic apparatus 10 is configured as described above.

(Flow of Output Modal Decision Processing)

Next, the flow of output modal decision processing to be executed by (processing unit 100 of) the electronic apparatus 10A will be described with reference to the flowchart of FIG. 5.

In step S11, the output modal decision unit 122 refers to the user information table and determines whether the information output destination is a registered user or not.

Here, FIG. 6 shows an example of a user information table. In this user information table, a user name, gender, age, and a desired output modal are stored for each user ID.

Specifically, four users of "Hiroshi", "Yuki", "Yuta", and "Yuzo" have been registered for user IDs of "01" to "04".

Regarding Hiroshi, gender of male and age of 38 years old have been registered, but a desired output modal has not been registered. Yuki is a 38-year-old woman who is registered to "always desire screen output" as a desired output modal.

Furthermore, Yuta has been registered as a 10-year-old man, but a desired output modal has not been registered. Yuzo is a 75-year-old man for whom "speak slowly in voice reading-aloud" is registered as a desired output modal.

Note that this user information is registered at a timing such as when the electronic apparatus 10 is purchased, for example. The user information is registered in, for example, (user information table of) the user information storage unit 401 of the server 40 when a setting screen is displayed on an electronic apparatus 10 such as a smartphone or a television receiver and the user performs an operation of inputting or selecting information in an item on the setting screen.

Furthermore, when registering this user information, a desired output modal can be set for each user. This setting is tied to the account of the user and shared by all electronic apparatuses 10. As a variation of the desired output modal, for example, those shown in the following (a) to (f) can be exemplified.

(a) Set voice reading-aloud (including translation of electronic sound) for all notifications (b) Set output with screen or light for all notifications (c) Setting of volume and speaking speed in the process of voice reading-aloud (d) Setting of color and size of characters in screen output (e) Setting of amplitude or vibration pattern in notification by vibration (f) Setting of color and lighting pattern in notification with light Returning to the description of FIG. 5, in a case where it is determined in the determination process of step S11 that the information output destination is a registered user, the process proceeds to step S12.

In step S12, the output modal decision unit 122 refers to the linked apparatus information table and determines whether the desired output modal is registered or not.

Here, FIG. 7 shows an example of a linked apparatus information table. In this linked apparatus information table, items of a device name and an output modal are provided for each apparatus ID assigned to an electronic apparatus 10, and information corresponding to each item is stored.

Specifically, a television receiver, a smartphone A, a smartphone B, a smart speaker, a robot vacuum cleaner, a refrigerator, and a washing machine are registered for device IDs of "00" to "06". Here, note that "screen" means screen output, "voice" means voice reading-aloud (e.g., text to speech (TTS)), and "electronic sound" means electronic sound output as an output modal.

Since the television receiver, the smartphone A, and the smartphone B include the display 102-1 and the speaker 102-2 in the output unit 102, the output modal includes "screen" and "voice". Since the smart speaker and the robot vacuum cleaner include the speaker 102-2 in the output unit 102, the output modal includes "voice". The refrigerator and the washing machine include an electronic sound buzzer 102-3 in the output unit 102, the output modal includes "electronic sound".

Note that this registration of linked apparatus information is performed manually or automatically at a timing such as when the electronic apparatus 10 is purchased, for example.

In the case of manual registration, for example, a setting screen is displayed on an electronic apparatus 10 such as a smartphone, and a user operates the setting. Furthermore, in the case of automatic registration, for example, setting information including information such as an apparatus ID, an apparatus name, and an output modal is transmitted via the Internet 50 to the server 40 and stored in the linked apparatus information table when a new electronic apparatus 10 is connected with the home network 30.

Returning to the description of FIG. 5, in a case where it is determined in the determination process of step S12 that the desired output modal is registered, the process proceeds to step S13.

In step S13, the output modal decision unit 122 refers to the linked apparatus information table and determines whether the desired output modal exists in the self-apparatus or not.

In a case where it is determined in the determination process of step S13 that the desired output modal exists in the self-apparatus, the process proceeds to step S14.

In step S14, the output modal decision unit 122 outputs information from the self-apparatus using the output modal desired by the user. In this case, in the electronic apparatus 10A that operates as the self-apparatus, the output unit 102 corresponding to the desired output modal outputs information according to the output command from the output modal decision unit 122.

Furthermore, in a case where it is determined in the determination process of step S13 that the desired output modal does not exist in the self-apparatus, the process proceeds to step S15.

In step S15, the output modal decision unit 122 refers to the linked apparatus information table and determines whether there is a linked apparatus having the desired output modal or not.

In a case where it is determined in the determination process of step S15 that a linked apparatus having the desired output modal exists, the process proceeds to step S16.

In step S16, the output modal decision unit 122 outputs information from the linked apparatus using the output modal desired by the user. In this case, in the electronic apparatus 10B that operates as the linked apparatus, the output unit 102 corresponding to the desired output modal outputs information according to the output command transmitted from the electronic apparatus 10A that operates as the self-apparatus.

Furthermore, in a case where it is determined in the determination process of step S11 that the information output destination is not a registered user, a case where it is determined in the determination process of step S12 that the desired output modal is not registered, or a case where it is determined in the determination process of S15 that there is no linked apparatus having the desired output modal, the process proceeds to step S17.

In step S17, the output modal decision unit 122 outputs information from the self-apparatus using a default output modal. In this case, in the electronic apparatus 10A that operates as the self-apparatus, the output unit 102 corresponding to the preset default output modal outputs information according to the output command from the output modal decision unit 122.

When any of the processes of steps S14, S16, and S17 ends, the output modal decision processing is terminated.

The flow of output modal decision processing has been described above. In this output modal decision processing, user information and linked apparatus information are acquired, and the electronic apparatus 10 having an output modal that outputs information is selected from among a plurality of electronic apparatuses 10 on the basis of the acquired user information and linked apparatus information, and information is outputted from an output modal of the selected electronic apparatus.

(Another Example of Linked Apparatus Information Table)

FIG. 8 shows another example of a linked apparatus information table referred to in the processes of steps S12, S13, and S15 of FIG. 5.

In FIG. 8, the linked apparatus information table is provided with items of an apparatus name, screen feedback, sound feedback, optical feedback, vibration, and operation for each apparatus ID, and information corresponding to each item is stored.

Furthermore, the screen feedback item includes the items of moving image output and alphanumeric output (e.g., capable of outputting only digital alphanumeric characters, etc.), the sound feedback item includes the items of voice reading-aloud and electronic sound output, and the optical feedback item includes the items of light emission in multiple colors and light emission in a single color.

Furthermore, the white circles (◦) in FIG. 8 indicate that the output modal represented by each item can be supported. That is, the linked apparatus information table of FIG. 8 shows an output modal in a subdivided manner as compared with the linked apparatus information table of FIG. 7 described above.

Since the television receiver includes the display 102-1 and the speaker 102-2, the output modal includes "moving image output" and "alphanumeric output", and "voice reading-aloud" and "electronic sound output".

The smartphones A and B each include the display 102-1, the speaker 102-2, the electronic sound buzzer 102-3, the vibrating element 102-4, and the lamp 102-5, and therefore each include "moving image output" and "alphanumeric output", "voice reading-aloud" and "electronic sound output", "light emission in single color", and "vibration" as output modals.

The smart speaker includes the speaker 102-2, the electronic sound buzzer 102-3, and the lamp 102-5, and therefore includes "voice reading-loud", "electronic sound output", and "light emission in multiple colors" as output modals. The robot vacuum cleaner includes the electronic sound buzzer 102-3 and a driving part, and therefore includes "electronic sound output" and "operation" as output modals. That is, the robot vacuum cleaner can output information by the movement of the self-apparatus.

The refrigerator and the washing machine each include the display 102-1, the electronic sound buzzer 102-3, and the lamp 102-5, and therefore each include "alphanumeric output", "electronic sound output", and "light emission in single color" as output modals. The microwave oven includes the display 102-1 and the electronic sound buzzer 102-3, and therefore includes "alphanumeric output" and "electronic sound output" as output modals.

The smartwatch includes the display 102-1, the speaker 102-2, the electronic sound buzzer 102-3, the vibrating element 102-4, and the lamp 102-5, and therefore respectively includes "moving image output" and "alphanumeric output", "voice reading-aloud" and "electronic sound output", "light emission in multiple colors", and "vibration" as output modals.

Note that the linked apparatus information table of FIG. 8 is an example, and another output modal may be added or deleted. Moreover, other information may be included as a subdivided output modal. For example, screen feedback may be categorized by a function such as screen size or resolution.

(Specific Example of Output Modal Decision)

Next, an example of selecting an output modal and deciding an output apparatus will be described with reference to FIGS. 9 to 12.

Since the following description illustrates a case where the electronic apparatuses 10-1 to 10-6 are a smart speaker, a smartphone, a television receiver, a washing machine, a refrigerator, and a smartwatch, the electronic apparatuses are also described as a smart speaker 10-1, a smartphone 10-2, a television receiver 10-3, a washing machine 10-4, a refrigerator 10-5, and a smartwatch 10-6.

(a) Case of Output by Self-Apparatus Capable of Voice Reading-Aloud

In FIG. 9, the smart speaker 10-1, the smartphone 10-2, and the television receiver 10-3 are apparatuses that include "voice" as an output modal and are capable of reading-loud of information.

For example, assumed is a case where a user makes an utterance of "Tell me the weather this week" and the user has registered "always desire voice reading-aloud" as a desired output modal.

At this time, since the smart speaker 10A-1 includes "voice" as an output modal, for example, the smart speaker operates as a self-apparatus, reads a text of "Weekly weather. It will be sunny from Monday to Wednesday, and it will rain on Friday and Saturday. The maximum temperature . . . " aloud, and outputs the text from the speaker 102-2 corresponding to the desired output modal.

In this way, in a case where the self-apparatus capable of voice reading-aloud deals with a user who desires voice reading-aloud, the self-apparatus outputs information by voice reading-aloud without performing apparatus linkage. Although this example has illustrated a case where the smart speaker 10A-1 performs reading-aloud, for example, note that the smartphone 10-2 or the television receiver 10-3 may perform reading-aloud depending on environment information and the like.

(b) Case of Requesting Output from a Linked Apparatus Capable of Voice Reading-Aloud In FIG. 10, the washing machine 10-4 and the refrigerator 10-5 include "electronic sound" as an output modal but do not include "voice", and are not apparatuses capable of voice reading-aloud of information.

For example, assumed is a case where washing is completed in the washing machine 10-4 and the user performing this washing has registered "always desire voice reading-aloud" as a desired output modal.

At this time, since the washing machine 10A-4 operates as a self-apparatus but does not include "voice" as an output modal, the washing machine refers to the linked apparatus information table and decides a smart speaker 10B-1 as a linked apparatus including "voice" as an output modal. The washing machine 10A-4 transmits an output command for outputting the fact that washing has been completed to the smart speaker 10B-1 via the home network 30.

Therefore, the smart speaker 10B-1 receives the output command transmitted from the washing machine 10A-4, reads the text "Washing was completed" loud, and outputs the text from the speaker 102-2 corresponding to the desired output modal.

In this way, in a case where the self-apparatus that cannot perform voice reading-aloud deals with a user who desires voice reading-aloud, a linked apparatus outputs information by voice reading-aloud by performing apparatus linkage and by the self-apparatus requesting output from the linked apparatus.

(c) Case where the Self-Apparatus Capable of Screen Output Outputs an Output

In FIG. 11, the smartphone 10-2, the television receiver 10-3, and the smartwatch 10-6 include "screen" as an output modal and are apparatuses capable of screen output of information.

For example, assumed is a case where a user makes an utterance of "Tell me the weather this week" and the user has registered "always desire screen output" as a desired output modal.

At this time, since the television receiver 10A-3 includes "screen" as an output modal, for example, the television receiver operates as a self-apparatus and outputs information regarding weekly weather from the display 102-1 corresponding to the desired output modal.

In this way, in a case where the self-apparatus capable of screen output deals with a user who desires screen output, the self-apparatus outputs information by screen output without performing apparatus linkage. Although a case where the television receiver 10-3 performs screen output is illustrated in this example, note that the smartphone 10-2 or the smartwatch 10-6 may perform screen output depending on, for example, the environment information and the like.

(d) Case of Requesting Output from a Linked Apparatus Capable of Screen Output

Figure 12:
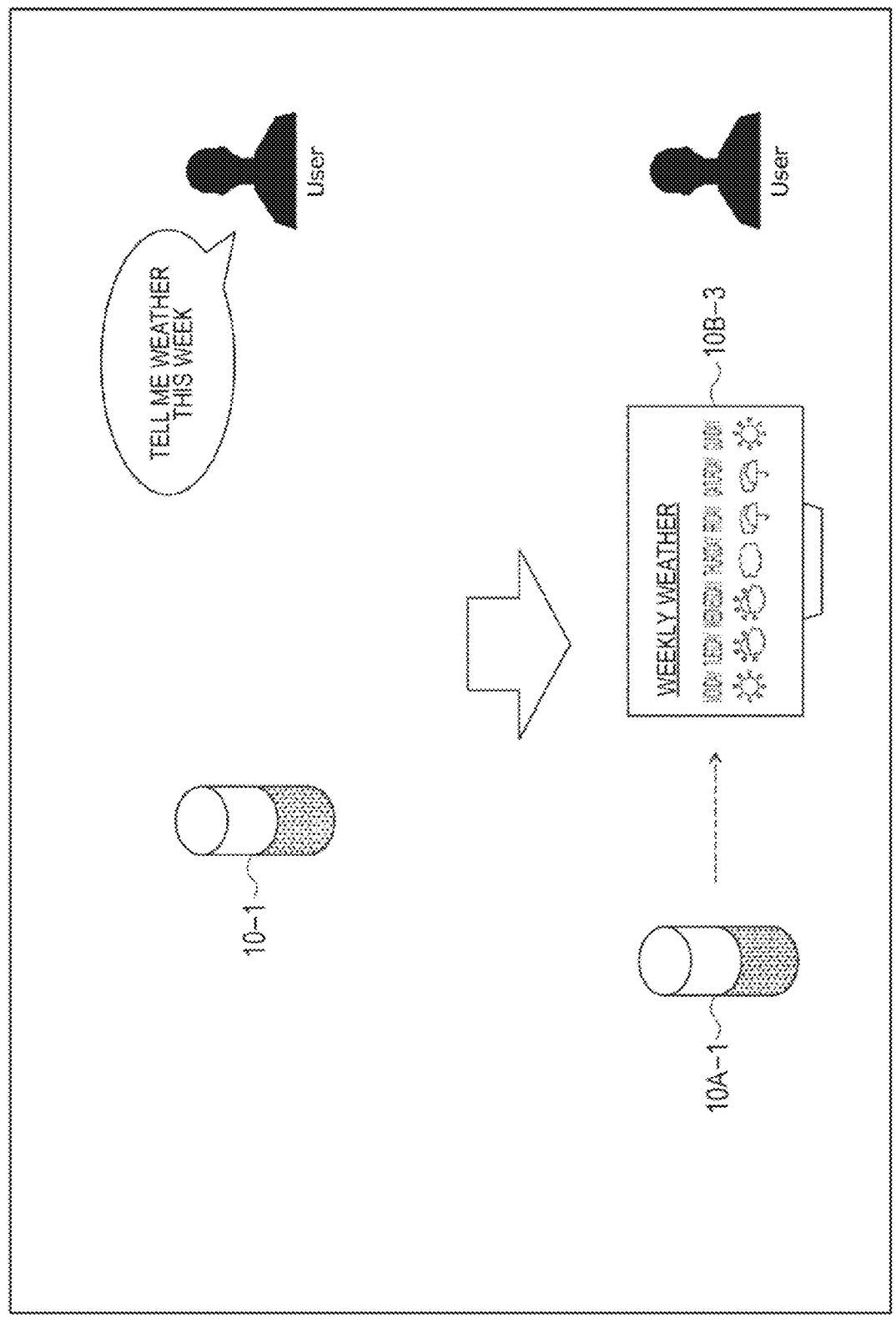
FIG. 12 is a diagram showing an example of a case where output is requested from a linked apparatus capable of screen output.

In FIG. 12, the smart speaker 10-1 includes "voice" as an output modal but does not include "screen", and is not an apparatus capable of screen output of information.

For example, assumed is a case where a user makes an utterance of "Tell me the weather this week" and the user has registered "always desire screen output" as a desired output modal.

At this time, since the smart speaker 10A-1 operates as a self-apparatus but does not include "screen" as an output modal, the smart speaker refers to the linked apparatus information table and decides the television receiver 10B-3 as a linked apparatus including "screen" as an output modal. The smart speaker 10A-1 transmits an output command for outputting information regarding weekly weather to the television receiver 10B-3 via the home network 30.

Therefore, the television receiver 10B-3 receives an output command transmitted from the smart speaker 10A-1 and outputs information regarding weekly weather from the display 102-1 corresponding to the desired output modal.

In this way, in a case where the self-apparatus that cannot perform screen output deals with a user who desires screen output, a linked apparatus outputs information by screen output by performing apparatus linkage and by the self apparatus requesting output from the linked apparatus.

As described above, in the present technology, one apparatus (self-apparatus) borrows an output modal of another apparatus (linked apparatus), so that the linked apparatus can output information using an optimal output modal for each user even if the apparatus has a limited output modal.

That is, although it has been common practice to consider the accessibility and select an optimal output modal, it has been premised that the apparatus itself includes an output modal such as screen output or voice reading-aloud, and therefore an output modal is limited especially in household electrical appliances, and it has been difficult to set the accessibility in that case.

In particular, among the users who use the electronic apparatus 10, there are physically handicapped people in visual or hearing sense, for example, or users who need consideration for the accessibility such as children and the elderly. For these users, it may be impossible to properly receive feedback from the apparatus if the output modal of the electronic apparatus 10 is limited.

For example, when information regarding weekly weather is outputted only by screen output in a case where a visually impaired user inquiries about weekly weather to an apparatus having only "screen" as an output modal, the user cannot confirm information displayed on the screen. On the other hand, in the present technology, even an apparatus (self-apparatus) having only "screen" as an output modal can output weekly weather by a voice by borrowing an output modal of another apparatus (linked apparatus), and it is therefore possible to give sufficient consideration to the accessibility.

Furthermore, in a case where a message is read aloud from an apparatus having only "voice" as an output modal to a hearing impaired user, for example, the user cannot confirm the voice of reading-aloud. On the other hand, in the present technology, even an apparatus (self-apparatus) having only "voice" as an output modal can output information regarding weekly weather by screen output by borrowing an output modal of another apparatus (linked apparatus).

Next, various examples of a case of using an electronic apparatus to which the present technology is applied will be described.

(Flow of Linked Apparatus Selection Processing)

Figure 13:
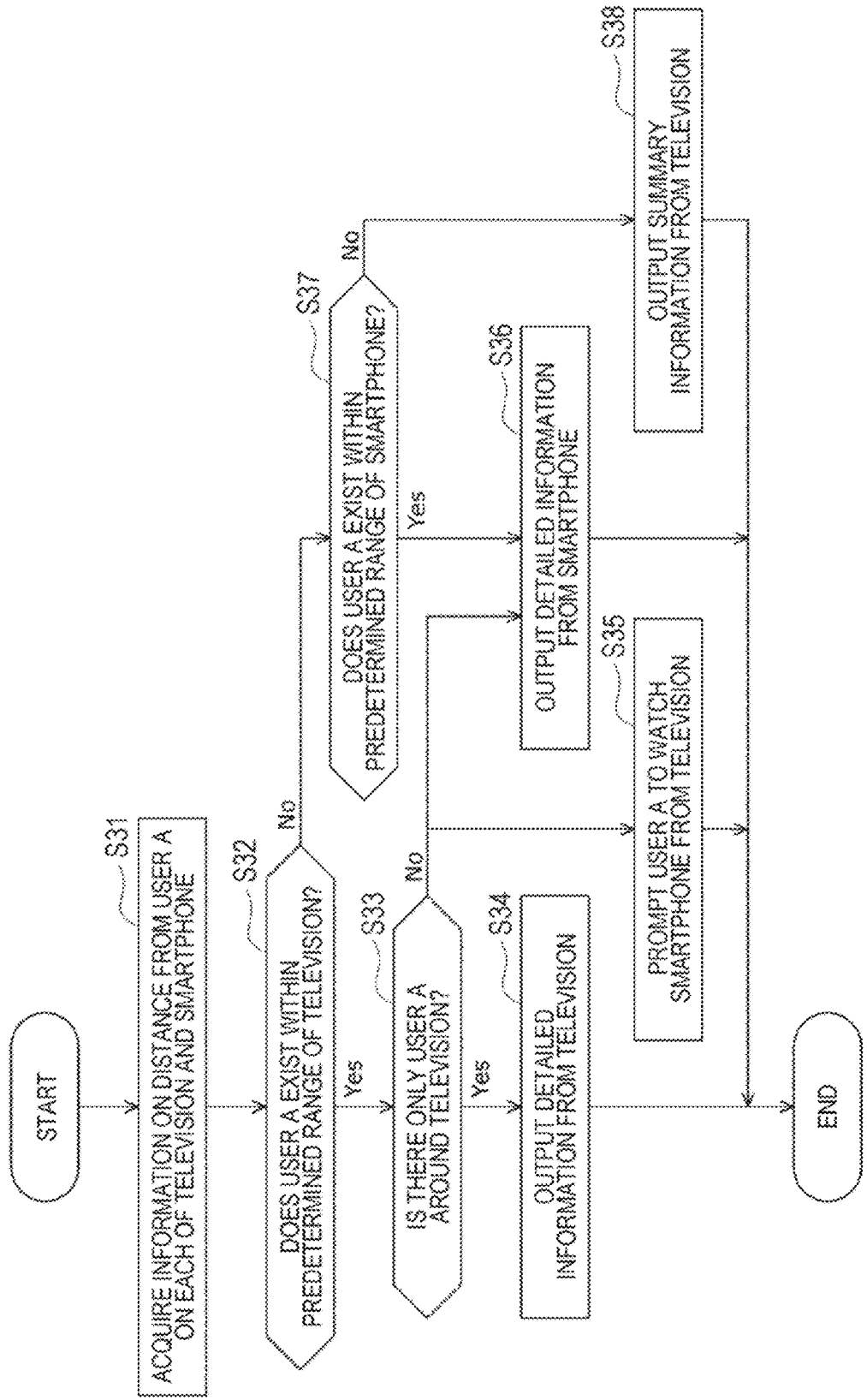
FIG. 13 is a flowchart for explaining the flow of linked apparatus selection processing.

First, the flow of linked apparatus selection processing to be executed by (processing unit 100 of) the electronic apparatus 10A will be described with reference to the flowchart of FIG. 13.

This linked apparatus selection processing is processing corresponding to step S16 of FIG. 5 and is processing of selecting a linked apparatus of the output destination from among linked apparatuses in a case where there is a plurality of linked apparatuses having an output modal desired by the user.

Illustrated here is a case where two apparatuses, i.e., a smartphone 10B-2 and a television receiver 10B-3, exist as linked apparatuses having an output modal (e.g., screen output, voice reading-aloud, etc.) desired by the user.

However, since the television receiver 10B-3 is set as the default output destination, the smartphone 10B-2 is selected here as the output destination depending on the situation. Moreover, the user who receives the information is referred to as a user A.

In step S31, the output modal decision unit 122 acquires the distance information regarding the distance from the user A on each of the television receiver 10B-3 and the smartphone 10B-2 on the basis of information such as the environment information.

Here, information on the distance between the television receiver 10B-3 and the user A, and information on the distance between the smartphone 10B-2 and the user A are each acquired, and the distance information may be, for example, calculated by an electronic apparatus 10A as the self-apparatus or acquired from another electronic apparatus 10.

In step S32, the output modal decision unit 122 determines whether the user A exists within a predetermined range (e.g., within a radius of 5 m) of the television receiver 10B-3 or not on the basis of the distance information. Note that a predetermined range such as within a radius of 5 m can be appropriately set by the designer or the user.

In a case where it is determined in the determination process of step S32 that the user A exists within the predetermined range of the television receiver 10B-3, the process proceeds to step S33.

In step S33, the output modal decision unit 122 determines whether there is only the user A around (e.g., the front position) the television receiver 10B-3 or not on the basis of information such as image information or environment information.

In a case where it is determined in the determination process of step S33 that there is only the user A in the vicinity, the process proceeds to step S34.

In step S34, the output modal decision unit 122 selects the television receiver 10B-3 as the output destination linked apparatus, and transmits an output command via the home network 30 to output (e.g., screen output) detailed information from the television receiver 10B-3. Therefore, the user A can see the detailed information displayed on the television receiver 10B-3, for example.

Furthermore, in a case where it is determined in the determination process of step S33 that there is a person other than the user A in the vicinity, the process proceeds to steps S35 and S36.

That is, the output modal decision unit 122 transmits an output command to the television receiver 10B-3 via the home network 30 to prompt the user A to watch the smartphone 10B-2 from the television receiver 10B-3 (S35). Furthermore, the output modal decision unit 122 transmits an output command to the smartphone 10B-2 via the home network 30 to output (screen output) detailed information from the smartphone 10B-2 owned by the user A (S36).

In this way, in order to avoid output (screen output) of information on the user A in front of other people, the output of the television receiver 10B-3 is limited to a simple notification, and the details of the information are outputted (screen output) from the smartphone 10B-2 owned by the user A.

On the other hand, in a case where it is determined in the determination process of step S32 that the user A does not exist within the predetermined range of the television receiver 10B-3, the process proceeds to step S37.

In step S37, the output modal decision unit 122 determines whether the user A exists within a predetermined range (e.g., within a radius of 5 m) of the smartphone 10B-2 or not on the basis of the distance information. Note that a predetermined range such as within a radius of 5 m can be appropriately set by the designer or the user.

In a case where it is determined in the determination process of step S37 that the user A exists within the predetermined range of the smartphone 10B-2, the process proceeds to step S36.

In step S36, the output modal decision unit 122 transmits an output command to the smartphone 10B-2 via the home network 30 to output (screen output) detailed information from the smartphone 10B-2 owned by the user A.

Furthermore, in a case where it is determined in the determination process of step S37 that the user A does not exist within the predetermined range of the smartphone 10B-2, the process proceeds to step S38.

In step S38, the output modal decision unit 122 transmits an output command to the television receiver 10B-3 via the home network 30 to output (screen output) summary information from the television receiver 10B-3.

That is, since both the television receiver 10B-3 and the smartphone 10B-2 are located far from the user A in this case, only the summary of information is outputted from the television receiver 10B-3 set as the default output destination.

When the processes of steps S34, S35, S36, and S38 end, the linked apparatus selection processing is terminated.

The flow of the linked apparatus selection processing has been described above. In this linked apparatus selection processing, it is possible to select an optimal linked apparatus by sensing the environment around the user in a case where there is a plurality of linked apparatuses having the same output modal.

Here, the priority ranking of the apparatuses can be decided in advance by some rule for selecting an optimal linked apparatus from among a plurality of linked apparatuses.

For example, by setting the television receiver 10B-3 as the default output destination as described above, information is outputted first from the television receiver 10B-3 in a case where screen output or voice reading-aloud is set as an output modal desired by the user. Alternatively, in a case where there is a plurality of linked apparatuses having an output modal desired by a user, for example, it is possible to select apparatuses in ascending order of apparatus IDs stored in the linked apparatus information table (FIG. 7).

Furthermore, various information such as voice information, image information, and environment information can be used in the process of selecting an optimal linked apparatus from among a plurality of linked apparatuses.

For example, in a case where information on whether a device exists near the user or not is considered in the process of selecting a linked apparatus, it is only required to use information such as image information or environment information (including sensing information), for example, to calculate the positional relation between the user and the apparatus. Furthermore, in a case where information on who is using the apparatus is considered, for example, the user recognition using a face or a voice can be performed by using the image information or the voice information.

Moreover, information such as whether the apparatus is in the field of view of the user or not, or whether the user is paying attention to the apparatus or not can be considered in the process of selecting a linked apparatus, by calculating information indicating the face orientation or line-of-sight of the user, for example, on the basis of the sensing information. Furthermore, the content of the information (message), notification of which is to be given, may be considered. For example, if the information includes personal information, the user may not want the information to be seen or heard by other users, and it is therefore necessary to select the linked apparatus in consideration thereof.

Furthermore, in a case where an output modal desired by the user is considered, it is important that the display is in the field of view of the user if screen output is desired, for example, and it is possible to preferentially select (display of) a linked apparatus in the field of view of the user on the basis of information such as image information or environment information. Moreover, if the user desires voice reading-aloud, for example, it is important that the voice outputted from (the speaker of) the linked apparatus has a distance and volume that can reach ears of the user, and it is possible to preferentially select (the speaker of) the linked apparatus near the user on the basis of information such as voice information, image information, environment information, and the like.

Specifically, assumed is a case where a certain household electrical appliance (self-apparatus) can request output of information from the television receiver 10B-3 installed in the living room and the smart speaker 10B-1 installed in the bedroom as linked apparatuses capable of voice reading-aloud at home of the user. At this time, the user sets voice reading-aloud as the desired output modal.

In this case, when the user is in the living room, the image sensor 103-2 built in the television receiver 10B-3 captures the situation, and the television receiver 10B-3 is selected as the linked apparatus. Therefore, in the living room, the user can confirm the content (information) of a voice of reading-aloud by the television receiver 10B-3.

(Flow of Second-Candidate Modal Selection Processing)

Figure 14:
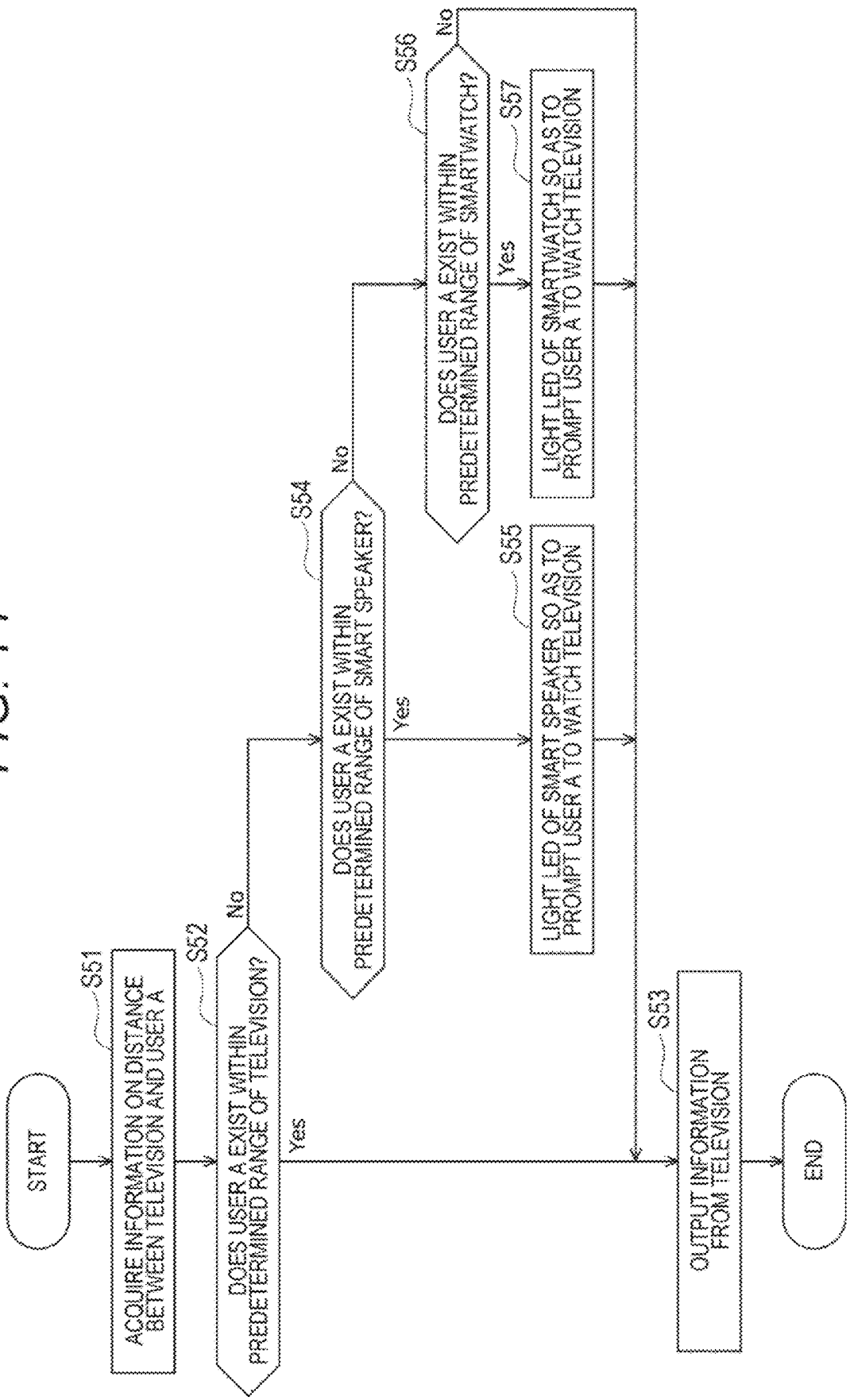
FIG. 14 is a flowchart for explaining the flow of a second-candidate modal selection processing.

Next, the flow of second-candidate modal selection processing to be executed by (processing unit 100 of) the electronic apparatus 10A will be described with reference to the flowchart of FIG. 14.

Here, assumed is a scene in which the smart speaker 10A-1 as the self-apparatus tries to select the television receiver 10B-3 as the linked apparatus and output (e.g., screen output) information from the television receiver 10B-3, though the user A is not near the television receiver 10B-3. However, "light" (notification by a light emission pattern) is set as the second-candidate output modal at this time.

In step S51, the output modal decision unit 122 acquires distance information regarding the distance between the television receiver 10B-3 and the user A on the basis of information such as the environment information. This distance information may be calculated by the smart speaker 10A-1 as the self-apparatus, or may be acquired from another electronic apparatus 10 such as the television receiver 10B-3.

In step S52, the output modal decision unit 122 determines whether the user A exists within a predetermined range (e.g., within a radius of 5 m) of the television receiver 10B-3 or not on the basis of the distance information.

In a case where it is determined in the determination process of step S52 that the user A exists within the predetermined range of the television receiver 10B-3, the process proceeds to step S53, and information is outputted (screen output) from the television receiver 10B-3. Therefore, the user A can see the information displayed on the television receiver 10B-3, for example.

On the other hand, in a case where it is determined in the determination process of step S52 that the user A does not exist within the predetermined range of the television receiver 10B-3, the process proceeds to step S54.

In step S54, the output modal decision unit 122 determines whether the user A exists within a predetermined range (e.g., within a radius of 5 m) of the smart speaker 10A-1 or not on the basis of the distance information obtained from information such as environment information.

Here, although the smart speaker 10A-1 and the smartwatch 10-6 are set as apparatuses having the second-candidate output modal, which is "light", the smart speaker 10-1A as the self-apparatus is trying to output (screen output) information through the television receiver 10B-3 as a linked apparatus, and therefore whether notification can be given with the LED of the smart speaker 10A-1 or not is checked first.

In a case where it is determined in the determination process of step S54 that the user A exists within the predetermined range of the smart speaker 10A-1, the process proceeds to step S55, and the processes of steps S55 and S53 are performed.

That is, the output modal decision unit 122 selects the self-apparatus as a device having the output modal of the second candidate, and supplies an output command to the lamp 102-5 to light the LED of the smart speaker 10A-1 and prompt the user A to watch the television receiver 10B-3 (S55).

Furthermore, the output modal decision unit 122 transmits an output command to the television receiver 10B-3 via the home network 30 to output (screen output) information from the television receiver 10B-3 (S53). Therefore, when the user A confirms that the LED of the smart speaker 10A-1 is lit, for example, the user A can see the information displayed on the television receiver 10B-3 in response to the lighting.

Furthermore, in a case where it is determined in the determination process of step S54 that the user A does not exist within the predetermined range of the smart speaker 10A-1, the process proceeds to step S56.

In step S56, the output modal decision unit 122 determines whether the user A exists within a predetermined range (e.g., within a radius of 5 m) of the smartwatch 10-6 or not on the basis of the distance information obtained from information such as the environment information.

Here, since notification of an apparatus having a second candidate output modal, which is "light", cannot be given with an LED at the smart speaker 10A-1 checked earlier, whether notification can be given with the LED of the smartwatch 10-6 or not is subsequently checked.

In a case where it is determined in the determination process of step S56 that the user A exists within the predetermined range of the smartwatch 10-6, the process proceeds to step S57, and the processes of steps S57 and S53 are performed.

That is, the output modal decision unit 122 selects the smartwatch 10B-6 as the output destination liked apparatus having the second-candidate output modal, and transmits an output command via the home network 30 to light the LED of the smartwatch 10B-6 and prompt the user A to watch the television receiver 10B-3 (S57).

Furthermore, the output modal decision unit 122 transmits an output command to the television receiver 10B-3 via the home network 30 to output (screen output) information from the television receiver 10B-3 (S53). Therefore, when the user A confirms lighting of the LED of the smartwatch 10B-6, for example, the user A can see the information displayed on the television receiver 10B-3 in response to the lighting.

Furthermore, in a case where it is determined in the determination process of step S56 that the user A does not exist within the predetermined range of the smartwatch 10B-6, the process proceeds to step S53, and the information is outputted (screen output) from the television receiver 10B-3. That is, since it is difficult to notify the user even using the second-candidate output modal in this case, the output is performed only by screen output by the television receiver 10B-3.

When the process of step S53 ends, the second-candidate modal selection processing is terminated.

The flow of second-candidate modal selection processing has been described above. In this second-candidate modal selection processing, the second-candidate output modal is set in the process of setting a desired output modal by the user, so that information can be outputted from a linked apparatus having the second-candidate output modal even in a case where there is no linked apparatus having the desired output modal near the user.

Although "light" is set as the second-candidate output modal in a case where "screen output" is set as the desired output modal in the above example, the present invention is not limited to this, and any combination can be used such as setting "electronic sound" (notification by pitch or pattern) as a second-candidate output modal in a case where "voice reading-aloud" is set as the desired output modal, for example.

Here, information necessary for selecting the second-candidate output modal can include, for example, the following information.

That is, information indicating the positional relation between the user and a linked apparatus having an output modal desired by the user can be considered on the basis of information such as image information or environment information. Moreover, it is possible to consider information indicating the positional relation between the user and the self-apparatus (apparatus that tries to output information), or the positional relation between the user and a linked apparatus having the second-candidate output modal.

In a case where the content of the information, notification of which is given, is of high importance, note that it is necessary to make the user notice the notification even if the user does not exist nearby.

Furthermore, in a case where none of the linked apparatuses having the output modal desired by the user is near the user, the following measures can be taken, for example, even when the second-candidate output modal is not set.

That is, in a case where the apparatus initiatively notifies the user of the information, the user may not be near the apparatus. In this case, a plurality of apparatuses can attract the attention of the user in linkage with each other and make the user get the information actively.

For example, assumed is a scene in which a user who has set screen output as the desired output modal has left the room where the television receiver is installed with the smartphone left, and the apparatus is trying to notify the user of the information. That is, in this scene, there is no apparatus that can perform screen output near the user.

At this time, a smart speaker is installed in the room to which the user moves, and this smart speaker makes the user recognize the existence of the information notification by, for example, lighting the LED in a peculiar pattern, so as to prompt the user to return to the living room. Therefore, the user who has returned to the living room can confirm the screen output from the smartphone or the television receiver.

Furthermore, in linkage with animal-shaped or human-shaped domestic robots or self-propelled devices such as robot vacuum cleaners, it is also possible for a dog-shaped robot to chase the user and make the user recognize the existence of information notification, for example, in a case where the user is not near the apparatus that is trying to give information notification as described above.

(Flow of Optimal Output Modal Selection Processing)

Figure 15:
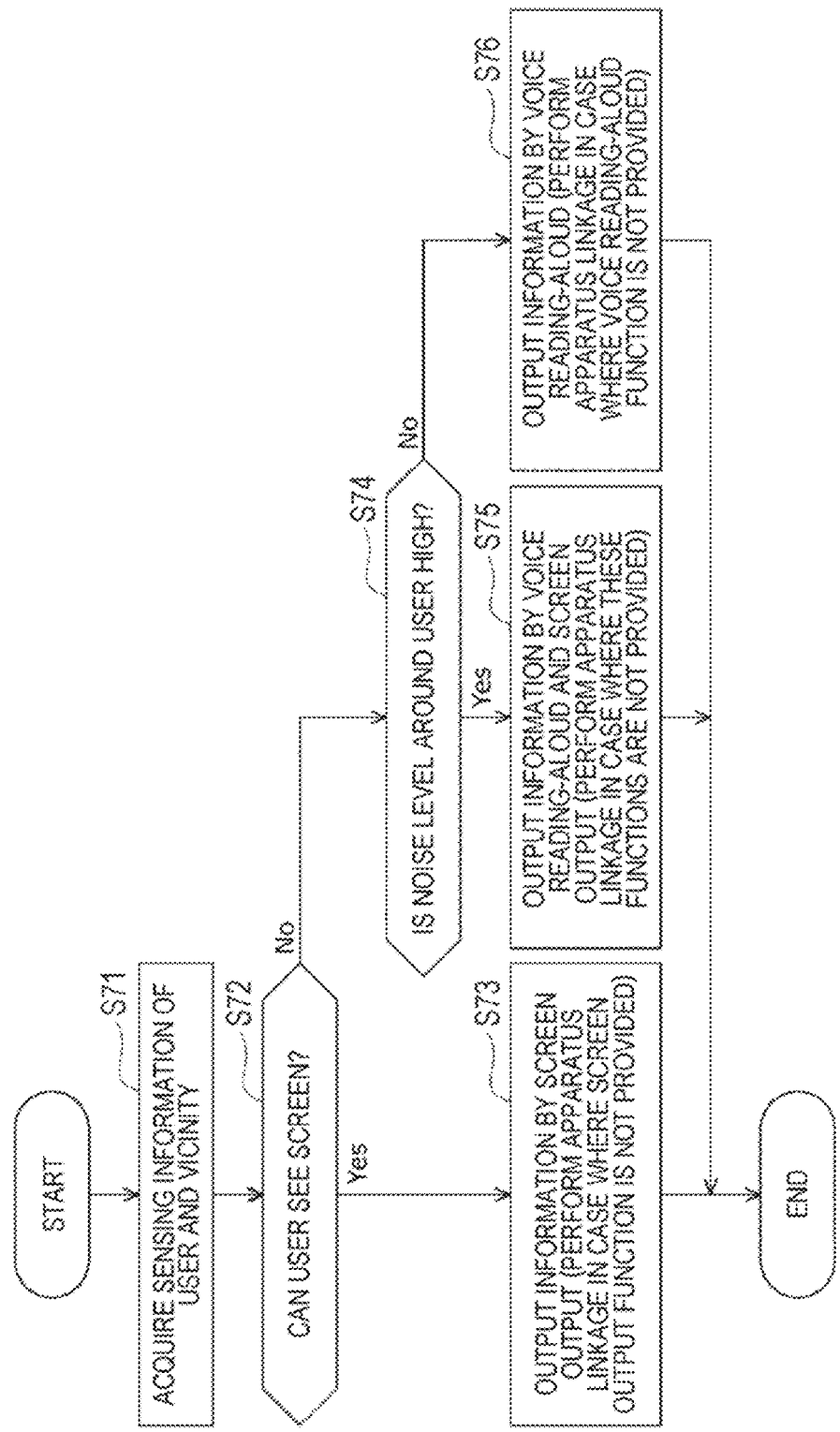
FIG. 15 is a flowchart for explaining the flow of an optimal output modal selection processing.

Next, the flow of the optimal output modal selection processing to be executed by (processing unit 100 of) the electronic apparatus 10A will be described with reference to the flowcharts of FIGS. 15 and 16.

Note that this optimal output modal selection processing is executed in, for example, a case where it is determined in the determination process of step S11 in the output modal decision processing of FIG. 5 that the information output destination is not a registered user ("No" in S11 of FIG. 5), or a case where it is determined in the determination process of step S12 that a desired output modal is not registered ("No" in S12 of FIG. 5).

That is, although the default output modal is selected in the process of step S17 in a case where the user is not registered or a case where the desired output modal is not set in the output modal decision processing of FIG. 5, an optimal output modal is selected even in this case by using information such as image information or environment information.

Here, the flow of the optimal modal selection processing of selecting an optimal output modal from the user and the ambient state thereof in a case where the information output destination is an unregistered user or a case where a desired output modal has not been set even if the information output destination is a registered user will be first described with reference to the flowchart of FIG. 15.

In step S71, the environment identification unit 123 acquires the sensing information of the user and the vicinity thereof as the environment information. Therefore, the environment identification unit 123 can identify the user and the ambient state thereof on the basis of the acquired sensing information.

In step S72, the environment identification unit 123 determines whether the user can see the screen or not on the basis of the environment identification result.

In a case where it is determined in the determination process of step S72 that the user can see the screen, the process proceeds to step S73.

In step S73, the output modal decision unit 122 supplies an output command to the display 102-1 and outputs information by screen output. Therefore, in a case where the user can see the screen, the information is outputted by screen output.

At this time, in a case where the self-apparatus does not have a screen output function, note that screen output of information from a linked apparatus is performed by performing apparatus linkage and transmitting an output command via the home network 30 to the linked apparatus.

On the other hand, in a case where it is determined in the determination process of step S72 that the user cannot see the screen, the process proceeds to step S74. That is, since it is assumed that the user does not notice information if the information is outputted by screen output in a case where the user is paying attention to the book, for example, the voice reading-aloud is selected here.

In step S74, the environment identification unit 123 determines whether the noise level around the user is higher than a predetermined threshold or not on the basis of the environment identification result.

In a case where it is determined in the determination process of step S74 that the noise level around the user is higher than the threshold, the process proceeds to step S75.

In step S75, the output modal decision unit 122 respectively supplies output commands to the display 102-1 and the speaker 102-2 and outputs information by voice reading-aloud and screen output. At this time, in a case where the self-apparatus does not have at least one of voice reading-aloud or screen display function, note that information from a linked apparatus is outputted by voice reading-aloud or screen output by performing apparatus linkage and transmitting an output command to the linked apparatus.

Furthermore, in a case where it is determined in the determination process of step S74 that the noise level around the user is lower than the threshold, the process proceeds to step S76.

In step S76, the output modal decision unit 122 supplies an output command to the speaker 102-2 and outputs information by voice reading-aloud. At this time, in a case where the self-apparatus does not have a voice reading-aloud function, note that information from a linked apparatus is outputted by voice reading-aloud by performing apparatus linkage and transmitting an output command to the linked apparatus.

Therefore, in a case where the ambient noise level is low, the information is outputted only by voice reading-aloud (S76), since the user can easily hear the voice. On the other hand, in a case where the user is wearing headphones and cannot hear the sound or a case where the ambient noise level is high, for example, screen output is selected rather than voice reading-aloud, and information can be outputted using a plurality of output modals (S75).

When any of the processes of steps S73, S75, and S76 ends, the optimal output modal selection processing is terminated.

Next, the flow of the optimal output modal selection processing of selecting an optimal output modal from user attribute in a case where the information output destination is an unregistered user or a case where a desired output modal has not been set even if the information output destination is a registered user will be described with reference to the flowchart of FIG. 16.

In step S91, the user identification unit 121 estimates user attribute on the basis of image information or voice information. The user attributes include, for example, information such as age and gender.

In step S92, the output modal decision unit 122 refers to the user attribute/output modal correspondence table. For example, this user attribute/output modal correspondence table is provided by the server 40 via the Internet 50.

In step S93, the output modal decision unit 122 determines whether a change in the output modal corresponding to the estimated user attribute is described in the user attribute/output modal correspondence table or not.

In a case where it is determined in the determination process of step S93 that a change in the output modal corresponding to the estimated user attribute is described, the process proceeds to step S94.

In step S94, the output modal decision unit 122 outputs information reflecting the change in the output modal described in the user attribute/output modal correspondence table.

Here, FIG. 17 shows an example of a user attribute/output modal correspondence table. In this user attribute/output modal correspondence table, an output modal change is stored for each user attribute such as age or gender.

Specifically, "Output by voice reading-aloud rather than electronic sound" and "Increase the volume by 1.2 times at this time" are registered as output modal changes for the user attribute of "estimated age is 70 or older". Furthermore, "Use hiragana instead of kanji in the case of screen output" is registered as an output modal change for the user attribute of "estimated age is younger than 10".

In this way, in a case where the attribute of a user who has not been registered or has not set the desired output modal is estimated (recognized) to be an elderly person (e.g., 70 years old or older), for example, the volume of 1.2 times the normal volume is outputted in voice reading-aloud. Note that the setting such as how many times the volume is to be increased is decided by, for example, the designer.

Returning to the description of FIG. 16, in a case where it is determined in the determination process of step S93 that a change in the output modal corresponding to the estimated user attribute is not described, the process proceeds to step S95. In step S95, the output modal decision unit 122 outputs information using a default output modal.

When either the process of step S94 or S95 ends, the optimal output modal selection processing is terminated.

The flow of the optimal output modal selection processing has been described above. In this optimal output modal selection processing, it is possible to select a more optimal output modal instead of the default output modal for a user who has not been registered or has not set a desired output modal.

Here, information necessary for selecting an optimal output modal can include, for example, the following information. That is, information regarding the behavior history of the user (e.g., tracking of the line-of-sight or face orientation, object recognition, etc.), information on the estimation result of the user attribute such as age or gender, and information regarding recognition of the ambient environment (e.g., ambient noise status, etc.) can be included.

(Example of Apparatus Used by a Plurality of People)

For example, in a case where a plurality of output modals such as the television receiver 10-3 installed in the living room can be selected and a plurality of people (e.g., family members, etc.) uses one electronic apparatus 10, a priority ranking is set for each user, and output can be performed using a desired output modal according to the priority ranking.

On the other hand, regarding notifications such as emails and messages, and temporary notifications such as weather tomorrow and today's schedule, it is possible to sort out information output destinations depending on the usage status of linked apparatuses.

For example, an output modal for watching television with the whole family can be selected by referring to the user information table shown in FIG. 18. That is, in the user information table of FIG. 18, a priority is added as an item for each user ID, and priorities are set in the order of Yuki, Hiroshi, Yuta, and Yuzo.

Here, since the priority of user ID 02 Yuki (who always desires screen output) is set to the highest, the subtitle mode is always turned on. In a case where Yuki is not in the living room, note that the setting of Hiroshi with user ID 01, which has the next highest priority, is prioritized.

Furthermore, in a case where Yuki is watching television, for example, the notification of the information to Yuki is displayed on the screen output, for example, the information pops up on the screen. On the other hand, in a case where a family member other than Yuki is watching television, notification of the information to Yuki is performed by, for example, screen output by the smartphone 10-2 owned by Yuki.

(Example of User Information Setting Screen)

Figure 19:
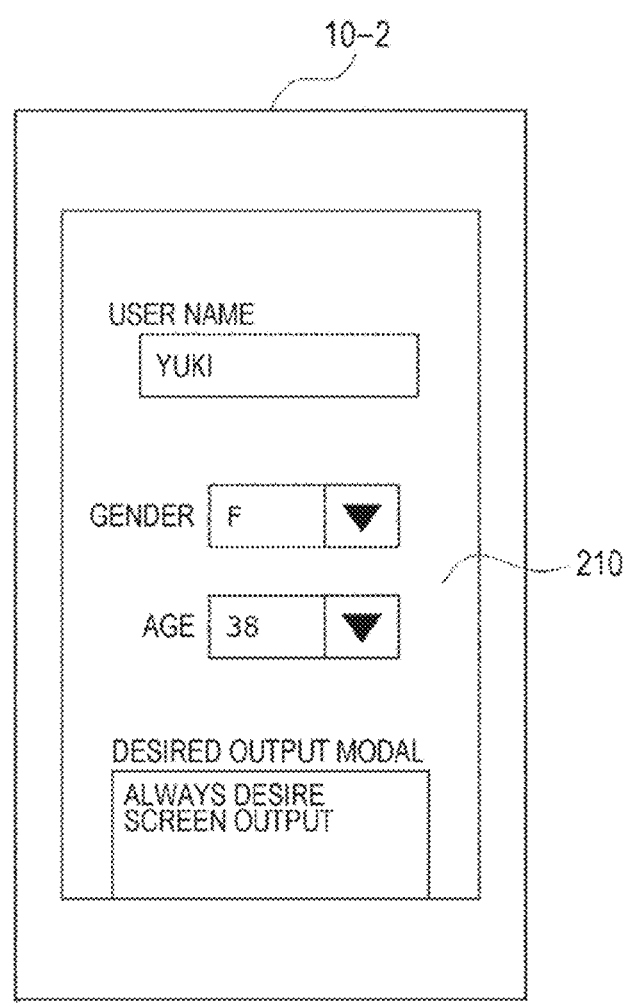
FIG. 19 is a diagram showing an example of a user information setting screen.

As described above, the user information is registered at the timing such as when the electronic apparatus 10 is purchased, by displaying a setting screen on the electronic apparatus 10. FIG. 19 shows an example of a user information setting screen 210 displayed on the display 102-1 of the smartphone 10-2.

In FIG. 19, items of the user name, gender, age, and desired output modal are displayed on the user information setting screen 210 in correspondence with the items of the user information table, and user information is registered in (user information table of) the user information storage unit 401 of the server 40 by performing an operation or the like of inputting or selecting information corresponding to these items.

(Example of Linkage Confirmation Information)

Figure 20:
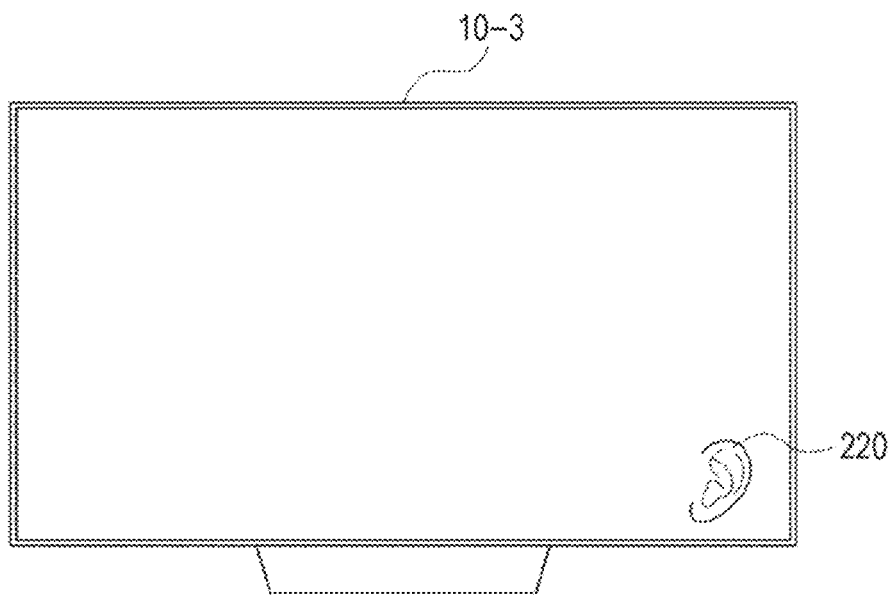
FIG. 20 is a diagram showing an example of linkage confirmation information during apparatus linkage.

Furthermore, in a case where information is outputted from a linked apparatus in response to a request from a main apparatus during apparatus linkage, notification of linkage confirmation information may be given to make the user confirm that the information is outputted from the linked apparatus. FIG. 20 shows an example of linkage confirmation information during apparatus linkage.

In FIG. 20, for example, the television receiver 10-3 outputs information by voice reading-aloud in response to a request from the main apparatus. At this time, the television receiver 10-3 displays information (e.g., an ear icon, etc.) for giving notification that voice reading-aloud is performed in response to a request from the main apparatus as linkage confirmation information 220. Therefore, the user can see the linkage confirmation information 220 and confirm that the television receiver 10-3 is performing voice reading-aloud in response to a request from the main apparatus.

(Other Configuration of System)

Figure 21:
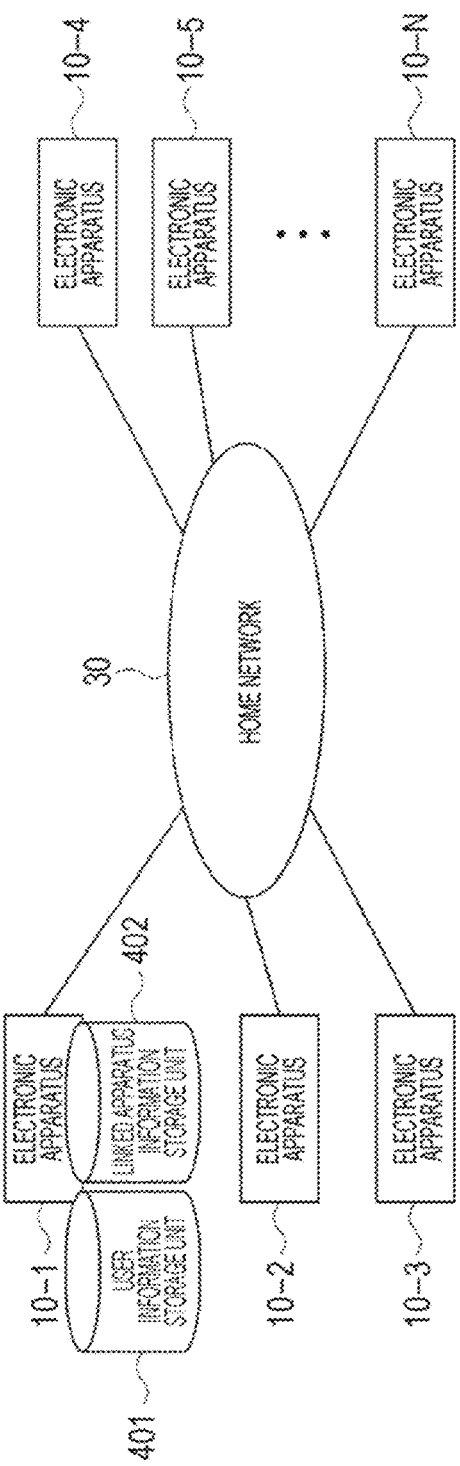
FIG. 21 is a block diagram showing another example of the configuration of an embodiment of a system including an electronic apparatus to which the present technology is applied.

FIG. 21 shows another example of the configuration of an embodiment of a system including an electronic apparatus to which the present technology is applied.

In FIG. 21, the electronic apparatuses 10-1 to 10-N (N: an integer equal to or larger than 2) are connected with each other via the home network 30.

The electronic apparatus 10-1 is configured as an apparatus such as an information apparatus, and stores the user information storage unit 401 and the linked apparatus information storage unit 402. The electronic apparatus 10-1 transmits user information or linked apparatus information via the home network 30 in response to a request from any of the electronic apparatuses 10-2 to 10-N.

The electronic apparatuses 10-2 to 10-N can perform processing such as the output modal decision processing (FIG. 5) described above on the basis of the user information and the linked apparatus information received from the electronic apparatus 10-1 via the home network 30.

Note that the electronic apparatus 10-1 can read out the user information and the linked apparatus information stored in the user information storage unit 401 and the linked apparatus information storage unit 402, and perform processing such as the output modal decision processing (FIG. 5) described above.

Furthermore, the electronic apparatus 10-1 may execute processing such as the output modal decision processing (FIG. 5) described above instead of the electronic apparatuses 10-2 to 10-N and transmit the processing result to the electronic apparatuses 10-2 to 10-N. Moreover, the electronic apparatus 10-1 may be configured as a server that manages the user information storage unit 401 and the linked apparatus information storage unit 402 as databases.

In this way, when a predetermined electronic apparatus 10 among the electronic apparatuses 10-1 to 10-N functions as a host and another electronic apparatus 10 makes an inquiry to the host, the user information and the linked apparatus information are acquired, and apparatus linkage is performed.

Although the above description has explained that the processing unit 100 in the electronic apparatus 10A on the local side has the user identification unit 121, the output modal decision unit 122, and the environment identification unit 123, note that all or part of the functions of the user identification unit 121 to the environment identification unit 123 may be incorporated in the server 40 on the cloud side. That is, each of the user identification unit 121 to the environment identification unit 123 may be incorporated in either the electronic apparatus 10A on the local side or the server 40 on the cloud side.

Furthermore, in the above description, the voice AI assistant service is a service that understands the intention of the utterance of the user and provides an appropriate output according to the content thereof. Moreover, the smart speaker is a speaker having an AI assistant function corresponding to interactive voice operation. A smartwatch is a multifunctional wristwatch-type wearable device equipped with a small display and a CPU.

<2. System Configuration>

An embodiment of the present technology has been described above. As described above, the electronic apparatus 10 to which the present technology is applied includes the processing unit 100, the input unit 101, and the output unit 102, and these components are realized by one or a plurality of information processing devices. The following description will explain an example of a combination of information processing devices that realize the electronic apparatus 10 configured as a system, together with a more specific example.

First Example

Figure 22:
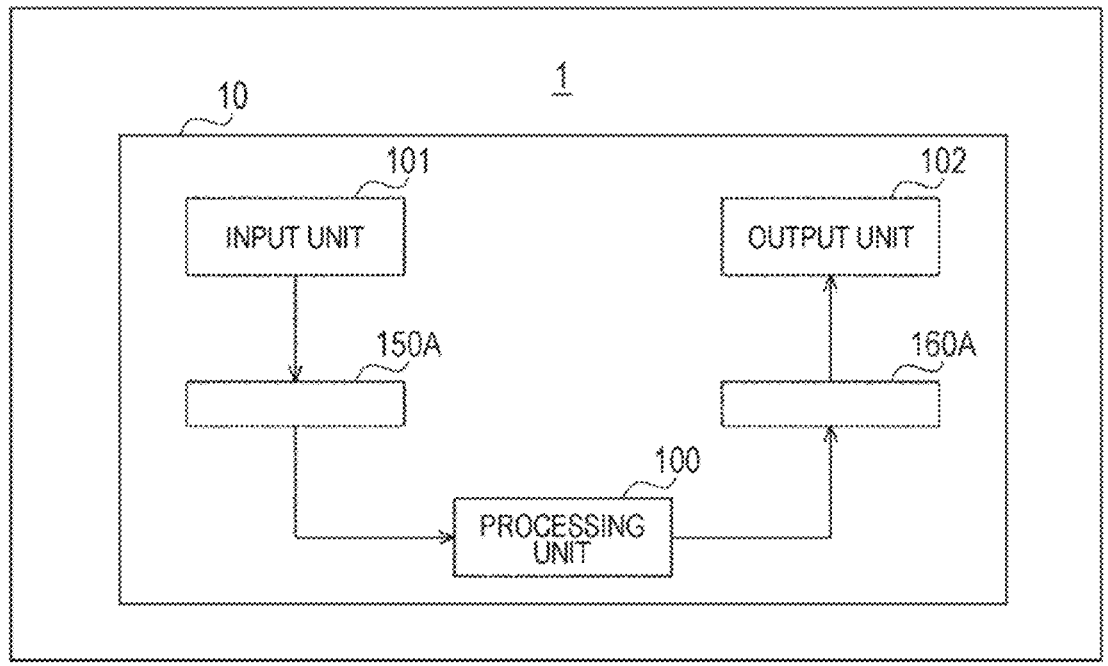
FIG. 22 is a block diagram showing a first example of the configuration of an embodiment of a system to which the present technology is applied.

FIG. 22 shows a first example of the configuration of an embodiment of a system to which the present technology is applied.

In FIG. 22, the system 1 includes an information processing device 10. The processing unit 100, the input unit 101, and the output unit 102 are all realized in the information processing device 10. The information processing device 10 can function as a terminal device or a server as described below.

In this first example, the information processing device 10 may be a stand-alone device that does not communicate with an external device via a network in order to realize the function according to an embodiment of the present technology. Note that the information processing device 10 may communicate with an external device for other functions, and therefore does not necessarily have to be a stand-alone device.

An interface 150A between the input unit 101 and the processing unit 100, and an interface 160A between the processing unit 100 and the output unit 102 can both function as interfaces in the device.

In the first example, the information processing device 10 is configured as, for example, a terminal device. In this case, the input unit 101 may include an input device, a sensor, software that acquires information from an external service, and the like. Software that acquires information from an external service acquires data from, for example, application software for a service executed in a terminal device.

The processing unit 100 is realized when the processor or the processing circuit included in the terminal device operates according to a program stored in a memory or a storage device. The output unit 102 may include an output device, a control device, software that provides information to an external service, and the like. Software that provides information to an external service can provide information to, for example, application software for a service executed in a terminal device.

Alternatively, in the first example, the information processing device 10 may be a server. In this case, the input unit 101 may include software that acquires information from an external service. The software that acquires information from an external service acquires data from, for example, a server of the external service (which may be the information processing device 10 itself).

The processing unit 100 is realized when the processor included in the terminal device operates according to a program stored in a memory or a storage device. The output unit 102 may include software that provides information to an external service, and the like. The software that provides information to the external service provides information to, for example, the server of the external service (which may be the information processing device 10 itself).

Second Example

Figure 23:
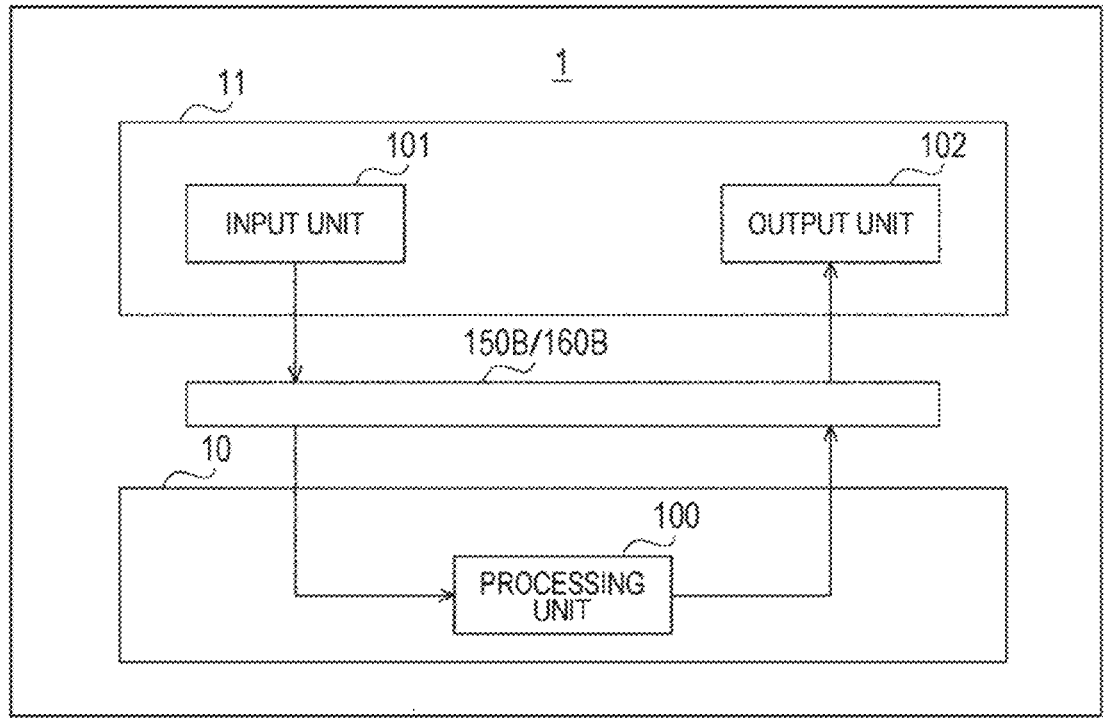
FIG. 23 is a block diagram showing a second example of the configuration of an embodiment of a system to which the present technology is applied.

FIG. 23 shows a second example of the configuration of an embodiment of a system to which the present technology is applied.

In FIG. 23, the system 1 includes information processing devices 10 and 11. The processing unit 100 is realized in the information processing device 10. On the other hand, the input unit 101 and the output unit 102 are realized in the information processing device 11.

The information processing device 10 and the information processing device 11 communicate with each other via a network in order to realize the function according to the embodiment of the present technology. An interface 150B between the input unit 101 and the processing unit 100, and an interface 160B between the processing unit 100 and the output unit 102 can both function as communication interfaces between devices.

In the second example, the information processing device 11 is configured as, for example, a terminal device. In this case, the input unit 101 may include an input device, a sensor, software that acquires information from an external service, and the like, similarly to the first example described above. The output unit 102 may also include an output device, a control device, software that provides information to an external service, and the like, similarly to the first example described above.

Alternatively, the information processing device 11 may be a server for exchanging information with an external service. In this case, the input unit 101 may include software that acquires information from an external service. Furthermore, the output unit 102 may include software that provides information to an external service.

Furthermore, in the second example, the information processing device 10 is configured as a server or a terminal device. The processing unit 100 is realized when a processor or a processing circuit included in the information processing device 10 operates according to a program stored in a memory or a storage device.

The information processing device 10 may be a dedicated device configured as, for example, a server. In this case, the information processing device 10 may be installed in a data center or the like, or may be installed at home.

Alternatively, the information processing device 10 may be a device that does not realize the input unit 101 and the output unit 102 with respect to the functions according to the embodiment of the present technology but can be used as a terminal device with respect to other functions. In the following example, the information processing device 10 may be a server or a terminal device in the sense described above.

Considered here as an example is a case where the information processing device 11 is a wearable device, and the information processing device 10 is a mobile device connected with the wearable device by Bluetooth (registered trademark) or the like.

In a case where the wearable device accepts (input unit 101) an operation input by the user, and the mobile device executes (processing unit 100) processing on the basis of a request transmitted on the basis of the operation input and outputs (output unit 102) the processing result from the wearable device, it can be said that the wearable device functions as the information processing device 11 in the second example described above, and the mobile device functions as the information processing device 10.

Third Example

Figure 24:
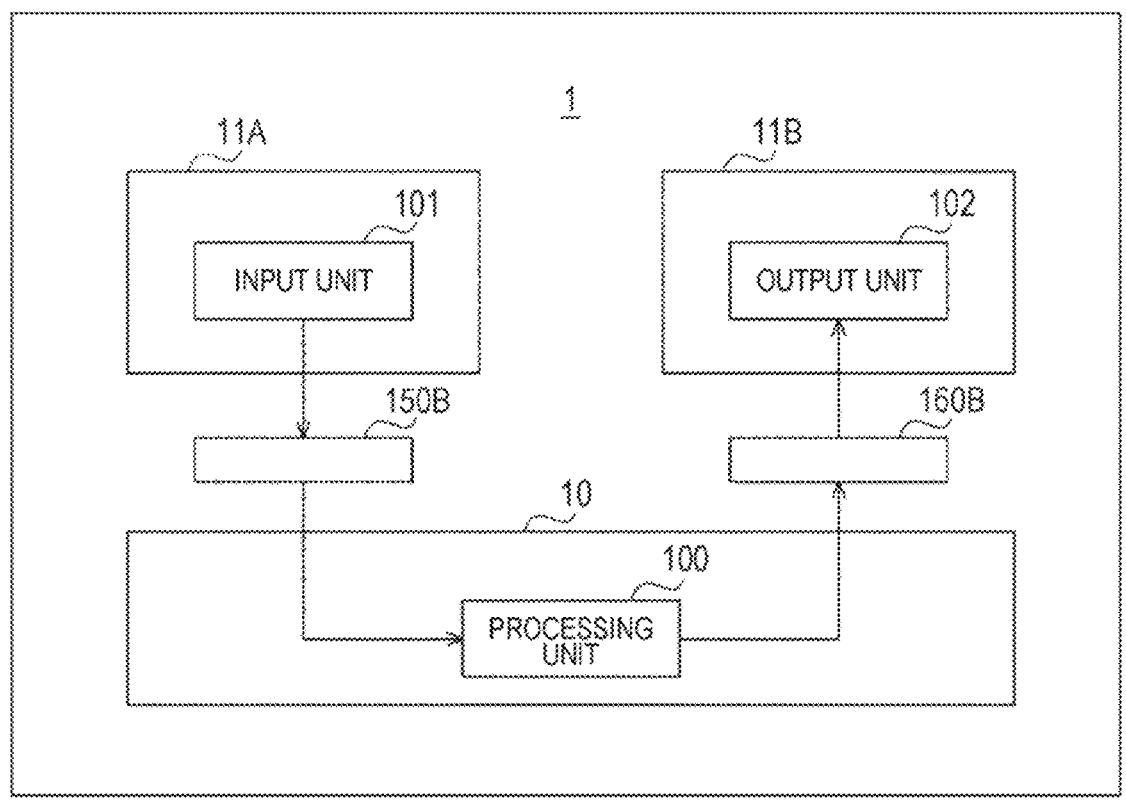
FIG. 24 is a block diagram showing a third example of the configuration of an embodiment of a system to which the present technology is applied.

FIG. 24 shows a third example of the configuration of an embodiment of a system to which the present technology is applied.

In FIG. 24, the system 1 includes information processing devices 10, 11A, and 11B. The processing unit 100 is realized in the information processing device 10.

Furthermore, the input unit 101 is realized in the information processing device 11A. The output unit 102 is realized in the information processing device 11B.

The information processing device 10 and the information processing devices 11A and 11B communicate with each other via a network in order to realize the function according to the embodiment of the present technology. An interface 150B between the input unit 101 and the processing unit 100, and an interface 160B between the processing unit 100 and the output unit 102 can both function as communication interfaces between devices.

However, in the third example, since the information processing device 11A and the information processing device 11B are separate devices, the interfaces 150B and 160B may include different types of interfaces.

In the third example, the information processing devices 11A and 11B are configured as, for example, terminal devices. In this case, the input unit 101 may include an input device, a sensor, software that acquires information from an external service, and the like, similarly to the first example described above. The output unit 102 may also include an output device, a control device, software that provides information to an external service, and the like, similarly to the first example described above.

Alternatively, one or both of the information processing devices 11A and 11B may be a server for acquiring information from an external service and providing information to an external service. In this case, the input unit 101 may include software that acquires information from an external service. Furthermore, the output unit 102 may include software that provides information to an external service.

Furthermore, in the third example, the information processing device 10 is configured as a server or a terminal device, similar to the second example described above. The processing unit 100 is realized when a processor or a processing circuit included in the information processing device 10 operates according to a program stored in a memory or a storage device.

In the third example described above, the information processing device 11A that realizes the input unit 101, and the information processing device 11B that realizes the output unit 102 are separate devices. Accordingly, realized is, for example, a function of outputting the result of processing based on an input acquired by the information processing device 11A that is a terminal device owned or used by a first user from the information processing device 11B that is a terminal device owned or used by a second user different from the first user.

Furthermore, also realized is a function of outputting the result of processing based on an input acquired by the information processing device 11A that is a terminal device owned or used by a first user from the information processing device 11B that is a terminal device that is not close at hand of the first user at that time (e.g., located at home during absence from home).

Alternatively, the information processing device 11A and the information processing device 11B may both be terminal devices owned or used by the same user. For example, in a case where the information processing devices 11A and 11B are wearable devices to be mounted on different parts of a user, or in a case where the information processing devices are a combination of a wearable device and a mobile device, the user can be provided with a function obtained by linkage of these devices.

Fourth Example

Figure 25:
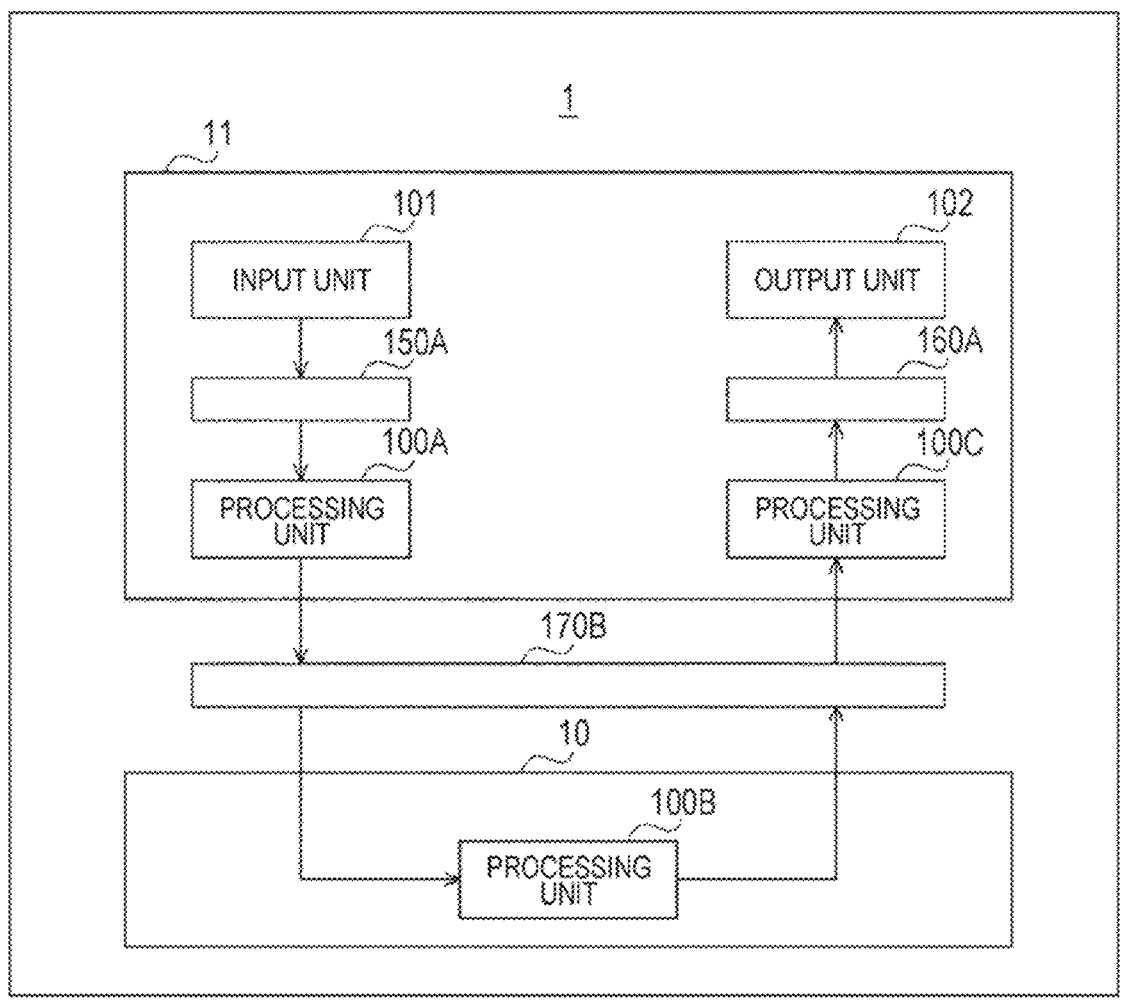
FIG. 25 is a block diagram showing a fourth example of the configuration of an embodiment of a system to which the present technology is applied.

FIG. 25 shows a fourth example of the configuration of an embodiment of a system to which the present technology is applied.

In FIG. 25, the system 1 includes information processing devices 10 and 11. In the fourth example, the processing unit 100 is distributed and realized in the information processing device 10 and the information processing device 11. On the other hand, the input unit 101 and the output unit 102 are realized in the information processing device 11.

The information processing device 10 and the information processing device 11 communicate with each other via a network in order to realize the function according to the embodiment of the present technology.

As described above, the processing unit 100 is distributed and realized in the information processing device 10 and the information processing device 11 in this fourth example. More specifically, the processing unit 100 includes a processing unit 100B realized by the information processing device 10, and processing units 100A and 100C realized by the information processing device 11.

The processing unit 100A executes processing on the basis of information provided from the input unit 101 via an interface 150A, and provides the processing result to the processing unit 100B. In this sense, it can be said that the processing unit 100A executes the pre-processing.

On the other hand, the processing unit 100C executes processing on the basis of the information provided from the processing unit 100B, and provides the processing result to the output unit 102 via an interface 160A. In this sense, it can be said that the processing unit 100C executes post-processing.

Although both the processing unit 100A that executes the pre-processing and the processing unit 100C that executes the post-processing are shown in the illustrated example, note that only one of them may exist in reality.

That is, the information processing device 11 may realize the processing unit 100A that executes the pre-processing but does not realize the processing unit 100C that executes the post-processing, and the information provided from the processing unit 100B may be provided to the output unit 102 as it is. Similarly, the information processing device 11 may realize the processing unit 100C that executes the post-processing, but not the processing unit 100A that executes the pre-processing.

Interfaces 170B are interposed respectively between the processing unit 100A and the processing unit 100B, and between the processing unit 100B and the processing unit 100C. The interface 170B is a communication interface between apparatuses.

On the other hand, in a case where the information processing device 11 realizes the processing unit 100A, the interface 150A is an interface in the device. Similarly, in a case where the information processing device 11 realizes the processing unit 100C, the interface 160A is an interface in the device.

Note that the fourth example described above is similar to the second example described above, except that one or both of the processing unit 100A and the processing unit 100C are realized by a processor or a processing circuit included in the information processing device 11. That is, the information processing device 11 is configured as a server for exchanging information with a terminal device or an external service. Furthermore, the information processing device 10 is configured as a server or a terminal device.

(Example of Distributed System)

Figure 26:
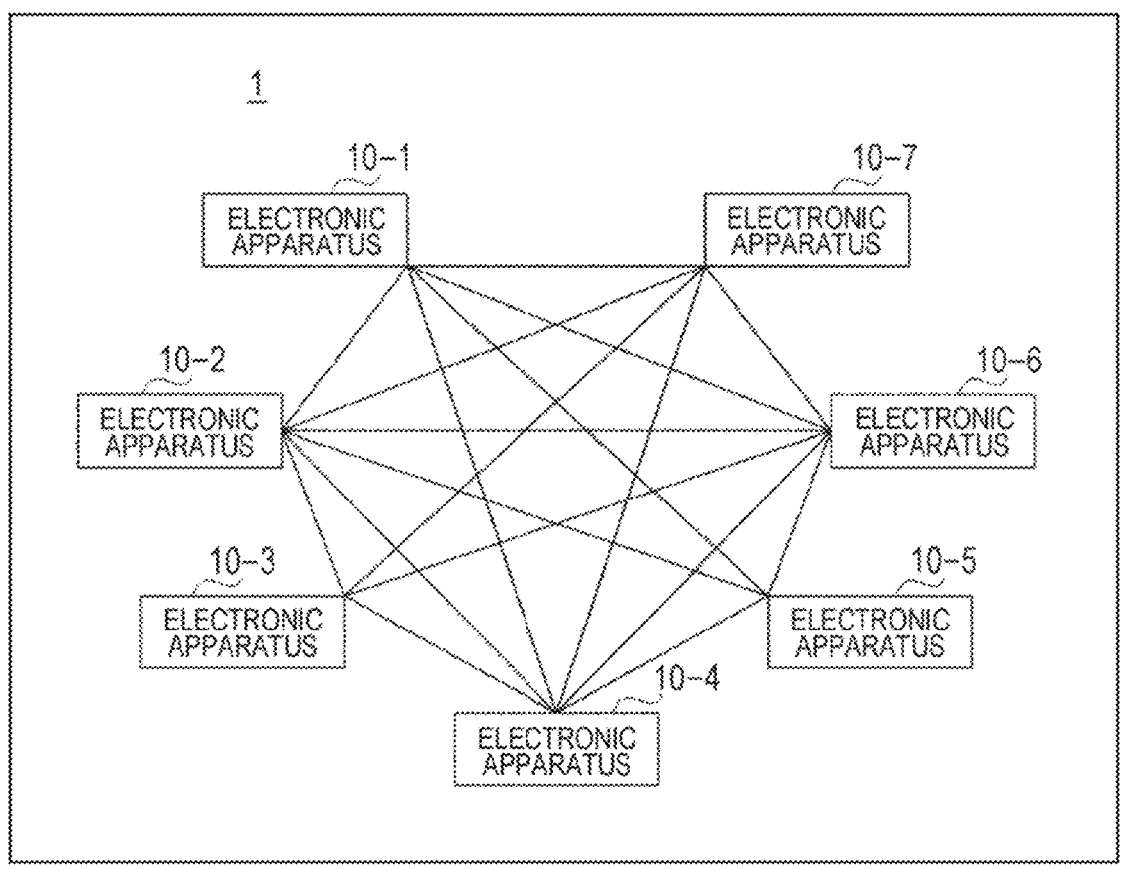
FIG. 26 is a diagram showing a distributed system as one of other specific examples of the configuration of an embodiment of a system to which the present technology is applied.

Next, another configuration example of the system 1 will be described with reference to FIG. 26. FIG. 26 shows a distributed system as one of other specific examples of the configuration according to an embodiment of a system to which the present technology is applied.

In FIG. 26, the information processing devices 10 (or information processing devices 11A and 11B) are nodes, and these information processing devices 10 are connected with each other via a network.

In the distributed system shown in FIG. 26, it is possible to cause devices to operate individually in linkage with each other, manage data in a distributed manner, and distribute processing. Therefore, it is possible to reduce the processing load, improve the real-time performance (improve response time and processing speed), and ensure security.

Furthermore, in this distributed system, it is also possible to perform machine learning in a distributed cooperative manner, and it is possible to process a large amount of data.

Furthermore, the distributed system shown in FIG. 26 does not require a server in a centralized system, and it is possible to monitor data with each other to secure the credibility. Specifically, for example, transaction information (ledger) can be shared by all participants (each information processing device 10) to strictly maintain the legitimacy (so-called blockchain).

In the blockchain, it is substantially impossible to falsify all the ledgers of all participants, and it is therefore possible to secure the credibility more reliably. Furthermore, in the blockchain, since it is necessary to recalculate all the hash values included in the blocks after a past block when falsifying the data included in that block, the processing load is too high and is substantially impossible, and it is therefore possible to secure the credibility more reliably.

Furthermore, in the blockchain, all participants share transaction information (distributed database) and write to such a distributed database by forming a specific consensus, which prevents fraud by a specific participant and maintains fairness.

<3. Computer Configuration>

Figure 27:
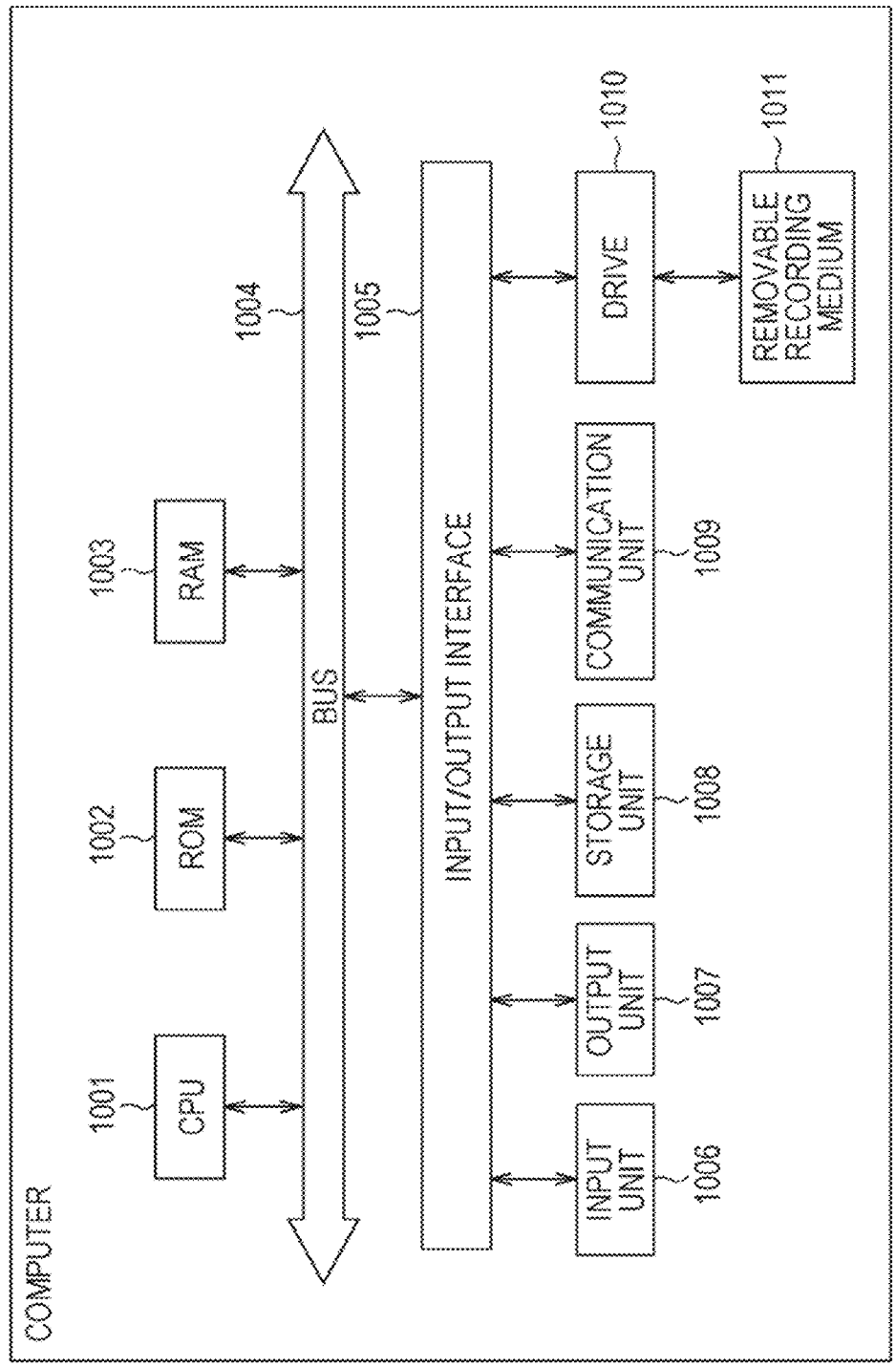
FIG. 27 is a diagram showing a configuration example of a computer.

A series of processes described above (e.g., output modal decision processing of FIG. 5, etc.) can be executed by hardware or software. In a case where a series of processes is executed by software, a program constituting the software is installed in a computer of each device. FIG. 27 is a block diagram showing a configuration example of the hardware of a computer that programmatically executes the series of processes described above.

In a computer, a central processing unit (CPU) 1001, a read only memory (ROM) 1002, and a random access memory (RAM) 1003 are connected with each other by a bus 1004. An input/output interface 1005 is further connected with the bus 1004. An input unit 1006, an output unit 1007, a recording unit 1008, a communication unit 1009, and a drive 1010 are connected with the input/output interface 1005.

The input unit 1006 includes a microphone, a keyboard, a mouse, and the like. The output unit 1007 includes a speaker, a display, and the like. The recording unit 1008 includes a hard disk, a non-volatile memory, and the like. The communication unit 1009 includes a network interface and the like. The drive 1010 drives a removable recording medium 1011 such as a magnetic disk, an optical disk, a magneto-optical disk, or a semiconductor memory.

In a computer configured as described above, the CPU 1001 loads a program recorded in the ROM 1002 or the recording unit 1008 into the RAM 1003 via the input/output interface 1005 and the bus 1004 and executes the program, so that the series of processes described above is performed.

A program executed by the computer (CPU 1001) can be recorded and provided on the removable recording medium 1011 as a package medium or the like, for example. Furthermore, programs can also be provided via wired or wireless transmission media such as local area networks, the Internet, or digital satellite broadcasting.

In a computer, a program can be installed in the recording unit 1008 via the input/output interface 1005 by mounting the removable recording medium 1011 in the drive 1010. Furthermore, the program can be received by the communication unit 1009 via a wired or wireless transmission medium and installed in the recording unit 1008. In addition, the program can be installed in advance in the ROM 1002 or the recording unit 1008.

Here, the processes performed by the computer according to the program do not necessarily have to be performed in chronological order in the order described herein as the flowcharts. That is, the processes performed by the computer according to the program also include processes executed in parallel or individually (e.g., parallel processing or object processing). Furthermore, the program may be processed by one computer (processor) or may be processed by a plurality of computers in a distributed manner.

Note that embodiments of the present technology are not limited to the embodiment described above, and various modifications can be made without departing from the gist of the present technology.

Furthermore, each step of the processes shown in the flowcharts described above can be executed by one device or can be shared and executed by a plurality of devices. Moreover, in a case where one step includes a plurality of processes, the plurality of processes included in the one step can be executed by one device or shared and executed by a plurality of devices.

Note that the present technology may have the following configurations.

(1)

An information processing device
including a processing unit configured to perform processes of:
acquiring apparatus information regarding an output modal for each electronic apparatus;
selecting an electronic apparatus having an output modal that outputs information from among a plurality of electronic apparatuses on the basis of the acquired apparatus information; and
outputting the information from an output modal of the selected electronic apparatus.

(2)

The information processing device according to (1),
in which the processing unit
further acquires user information regarding a user, and
selects an electronic apparatus having an output modal corresponding to the user information from among the plurality of electronic apparatuses on the basis of the acquired user information and apparatus information.

(3)

The information processing device according to (2),
in which the user information includes a desired output modal of the user, and
the processing unit selects an electronic apparatus having an output modal corresponding to the desired output modal.

(4)

The information processing device according to (3),
in which the plurality of electronic apparatuses includes a self-apparatus that is a subject of operation, and a linked apparatus that operates in linkage with the self-apparatus.

(5)

The information processing device according to (4),
in which the processing unit selects a linked apparatus having an output modal corresponding to the desired output modal in a case where the self-apparatus does not have an output modal corresponding to the desired output modal.

(6)

The information processing device according to (5),
in which the processing unit transmits an output command to output the information from an output modal corresponding to the desired output modal to the selected linked apparatus via a network.

(7)
The information processing device according to (6),
in which the processing unit
selects the self-apparatus in a case where the self-apparatus has an output modal corresponding to the desired output modal, and
outputs the output command to an output modal of the selected self-apparatus.

(8)
The information processing device according to any one of (4) to (7),
in which the processing unit selects an optimal linked apparatus from among a plurality of selected linked apparatuses on the basis of sensing information obtained by sensing a vicinity of the user in a case where a plurality of linked apparatuses having an output modal corresponding to the desired output modal is selected.

(9)
The information processing device according to any one of (3) to (8),
in which the user information further includes a second-candidate desired output modal of the user, and
the processing unit selects an electronic apparatus having an output modal corresponding to the second-candidate desired output modal in a case where an electronic apparatus having an output modal corresponding to the desired output modal cannot be selected.

(10)
The information processing device according to any one of (3) to (9),
in which the user information includes a priority for each user, and
the processing unit selects an electronic apparatus having an output modal corresponding to a desired output modal according to the priority.

(11)
The information processing device according to any one of (1) to (10),
in which the processing unit
estimates an attribute of a user, and
changes a content of an output modal depending on the estimated attribute.

(12)
The information processing device according to any one of (1) to (11)
in which the output modal includes at least one of screen feedback, sound feedback, optical feedback, vibration, or operation.

(13)
The information processing device according to (12),
in which at least one of the output modals includes a more subdivided function.

(14)
The information processing device according to any one of (3) to (10),
in which the processing unit
identifies the user on the basis of identification information of the user, and
selects an electronic apparatus having an output modal corresponding to a desired output modal of the identified user.

(15)
The information processing device according to any one of (4) to (10),
which is included in the plurality of electronic apparatuses, and
operates as the self-apparatus.

(16)
The information processing device according to any one of (2) to (10),
in which at least one of the apparatus information or the user information is acquired from a server via Internet.

(17)
An information processing method
in which an information processing device
acquires apparatus information regarding an output modal for each electronic apparatus,
selects an electronic apparatus having an output modal that outputs information from among a plurality of electronic apparatuses on the basis of the acquired apparatus information, and
outputs the information from an output modal of the selected electronic apparatus.

(18)
An information processing device
including a processing unit configured to perform processes of:
selecting an electronic apparatus having an output modal corresponding to a desired output modal of a user from among a plurality of electronic apparatuses on the basis of user information including the desired output modal and apparatus information regarding an output modal for each electronic apparatus, receiving via a network an output command to output information transmitted from another information processing device that transmits the output command from an output modal corresponding to the desired output modal to the selected electronic apparatus, and
outputting the information from an output modal corresponding to the desired output modal on the basis of the received output command.

(19)
The information processing device according to (18),
which is included in the plurality of electronic apparatuses, and
operates as a linked apparatus that is linked with a self-apparatus that is a subject of operation,
in which the output command is transmitted from the self-apparatus.

(20)
An information processing method
in which an information processing device
selects an electronic apparatus having an output modal corresponding to a desired output modal of a user from among a plurality of electronic apparatuses on the basis of user information including the desired output modal and apparatus information regarding an output modal for each electronic apparatus, receives via a network an output command to output information transmitted from another information processing device that transmits the output command to the selected electronic apparatus from an output modal corresponding to the desired output modal, and
outputs the information from an output modal corresponding to the desired output modal on the basis of the received output command.

REFERENCE SIGNS LIST

10, 10-1 to 10-N Electronic apparatus
10A Self-apparatus

10B Linked apparatus
20 Router
30 Home network
40 Server
50 Internet
100 Processing unit
101 Input unit
101-1 Microphone
101-2 Button
102-1 Display
102-2 Speaker
102-3 Electronic sound buzzer
102-4 Vibrating element
102-5 Lamp
102 Output unit
103 Sensor unit
104 Communication unit
105 Storage unit
121 User identification unit
122 Output modal decision unit
123 Environment identification unit
131 Speaker identification unit
132 Face identification unit
133 Identification result integration unit
141 Output command analysis unit
142 Output control unit
401 User information storage unit
402 Linked apparatus information storage unit
1001 CPU

The invention claimed is:

1. An information processing method executed by an information processing device that has at least an output modal, the information processing method comprising:
acquiring apparatus information regarding availability of output modals for each of a plurality of electronic apparatuses connected to the information processing device via a network;
acquiring user information regarding a user that indicates a desired output modal of the user, the desired output modal being registered in advance by the user;
determining whether the output modal of the information processing device corresponds to the desired output modal on the basis of the acquired user information;
selecting, under a condition where it is determined that the output modal of the information processing device does not correspond to the desired output modal, an electronic apparatus having an output modal corresponding to the desired output modal from among the plurality of electronic apparatuses on the basis of the acquired apparatus information and the acquired user information; and
outputting information for the user from the output modal of the information processing device or the output modal of the selected electronic apparatus on the basis of the determination, wherein
the user information further indicates a second-candidate desired output modal of the user, the second-candidate desired output modal being different from the desired output modal, and
the information processing method further comprises:
selecting an electronic apparatus having an output modal corresponding to the second-candidate desired output modal in a case where an electronic apparatus having an output modal corresponding to the desired output modal cannot be selected.

2. An information processing device having at least an output modal, the information processing device comprising:
processing circuitry configured to perform processes of
acquiring apparatus information regarding availability of output modals for each of a plurality of electronic apparatuses connected to the information processing device via a network;
acquiring user information regarding a user that indicates a desired output modal of the user, the desired output modal being registered in advance by the user;
determining whether the output modal of the information processing device corresponds to the desired output modal on the basis of the acquired user information;
selecting, under a condition where it is determined that the output modal of the information processing device does not correspond to the desired output modal, an electronic apparatus having an output modal corresponding to the desired output modal from among the plurality of electronic apparatuses on the basis of the acquired apparatus information and the acquired user information; and
outputting information for the user from the output modal of the information processing device or the output modal of the selected electronic apparatus on the basis of the determination, wherein
the user information further indicates a second-candidate desired output modal of the user, the second-candidate desired output modal being different from the desired output modal, and
the processing circuitry is further configured to perform a process of
selecting an electronic apparatus having an output modal corresponding to the second-candidate desired output modal in a case where an electronic apparatus having an output modal corresponding to the desired output modal cannot be selected.

3. The information processing device according to claim 2, wherein
the processing circuitry is further configured to perform a process of
outputting the information for the user from the output modal of the selected electronic apparatus corresponding to the desired output modal in a case where it is determined that the output modal of the information processing device does not correspond to the desired output modal.

4. The information processing device according to claim 3, wherein
the processing circuitry is further configured to perform a process of
transmitting, to the selected electronic apparatus via the network, an output command to output the information from the output modal corresponding to the desired output modal.

5. The information processing device according to claim 4, wherein
the processing circuitry is further configured to perform a process of
outputting the information for the user from the output modal of the information processing device corresponding to the desired output modal in a case where it is determined that the output modal of the information processing device corresponds to the desired output modal.

6. The information processing device according to claim 2, wherein
where plural electronic apparatuses each have an output modal corresponding to the desired output modal, the processing circuitry is further configured to perform a process of
selecting an optimal electronic apparatus from among the plural electronic apparatuses on the basis of environment information obtained by sensing a vicinity of the user.

7. The information Processing device according to claim 2 wherein
the user information includes priority information that indicates priority ranks among plural users where the information processing device is used by the plural users, and
the processing circuitry is further configured to perform a process of selecting an electronic apparatus having an output modal corresponding to the desired output modal according to the priority information.

8. The information processing device according to claim 2, wherein
the processing circuitry is further configured to perform processes of
estimating an attribute of the user, and
applying a change to the output modal that outputs the information, depending on the estimated attribute.

9. The information processing device according to claim 2 wherein
the output modal includes at least one of screen feedback, sound feedback, optical feedback, vibration, and operation.

10. The information processing device according to claim 9, wherein at least one of the output modals includes subdivided output modals.

11. The information processing device according to claim 2, wherein
the processing circuitry is further configured to perform processes of
identifying the user on the basis of identification information of the user, and
selecting an electronic apparatus having an output modal corresponding to the desired output modal of the identified user.

12. The information processing device according to claim 2, wherein at least one of the apparatus information and the user information is acquired from a server via Internet.

* * * * *